(12) United States Patent
Bone et al.

(10) Patent No.: US 10,295,788 B2
(45) Date of Patent: May 21, 2019

(54) OCULAR OPTICAL SYSTEM

(71) Applicant: GENIUS ELECTRONIC OPTICAL CO., LTD., Taichung (TW)

(72) Inventors: Matthew Bone, Xiamen (CN); Ruyou Tang, Xiamen (CN); Tacheng Fan, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 130 days.

(21) Appl. No.: 15/415,662

(22) Filed: Jan. 25, 2017

(65) Prior Publication Data

US 2018/0196230 A1    Jul. 12, 2018

(30) Foreign Application Priority Data

Jan. 11, 2017    (CN) .......................... 2017 1 0021201

(51) Int. Cl.
| | |
|---|---|
| *G02B 3/04* | (2006.01) |
| *G02B 13/00* | (2006.01) |
| *G02B 25/00* | (2006.01) |
| *G02B 9/34* | (2006.01) |

(52) U.S. Cl.
CPC ............. *G02B 13/004* (2013.01); *G02B 3/04* (2013.01); *G02B 9/34* (2013.01); *G02B 25/001* (2013.01)

(58) Field of Classification Search
CPC ...... G02B 13/004; G02B 9/34; G02B 25/001; G02B 27/0025
USPC ........................................................ 359/644
See application file for complete search history.

(56) References Cited

U.S. PATENT DOCUMENTS 5,973,847 A * 10/1999 Sugawara ............ G02B 25/001
                                                        359/644
7,804,651 B2     9/2010 Janeczko et al.

FOREIGN PATENT DOCUMENTS

| CN | 204422862 U | 6/2015 |
|---|---|---|
| CN | 204462536 U | 7/2015 |
| CN | 105319700 A | 2/2016 |
| CN | 106019570 A | 10/2016 |
| JP | 6003503 B2 | 10/2016 |
| TW | I529420 B | 4/2016 |

OTHER PUBLICATIONS

Office Action for Taiwanese Application No. 106102641 dated Feb. 22, 2018; 8 pages.
Office Action in Chinese Application No. 201710021201.3 dated Oct. 18, 2018; 6 pages.

\* cited by examiner

*Primary Examiner* — James R Greece
(74) *Attorney, Agent, or Firm* — Baker & McKenzie LLP

(57) ABSTRACT

Present embodiments provide for an ocular optical system. The ocular optical system includes a first lens element, a second lens element, a third lens element, a fourth lens element, a fifth lens element and a sixth lens element positioned in an order from an eye-side to an display-side. Through designing parameters satisfying at least two inequalities and convex and/or concave surface of lens elements, the improved ocular optical system may provide better optical characteristics, a decreased effective focal length and an enlarged angle of view while the total length of the ocular optical system may be shortened.

16 Claims, 38 Drawing Sheets

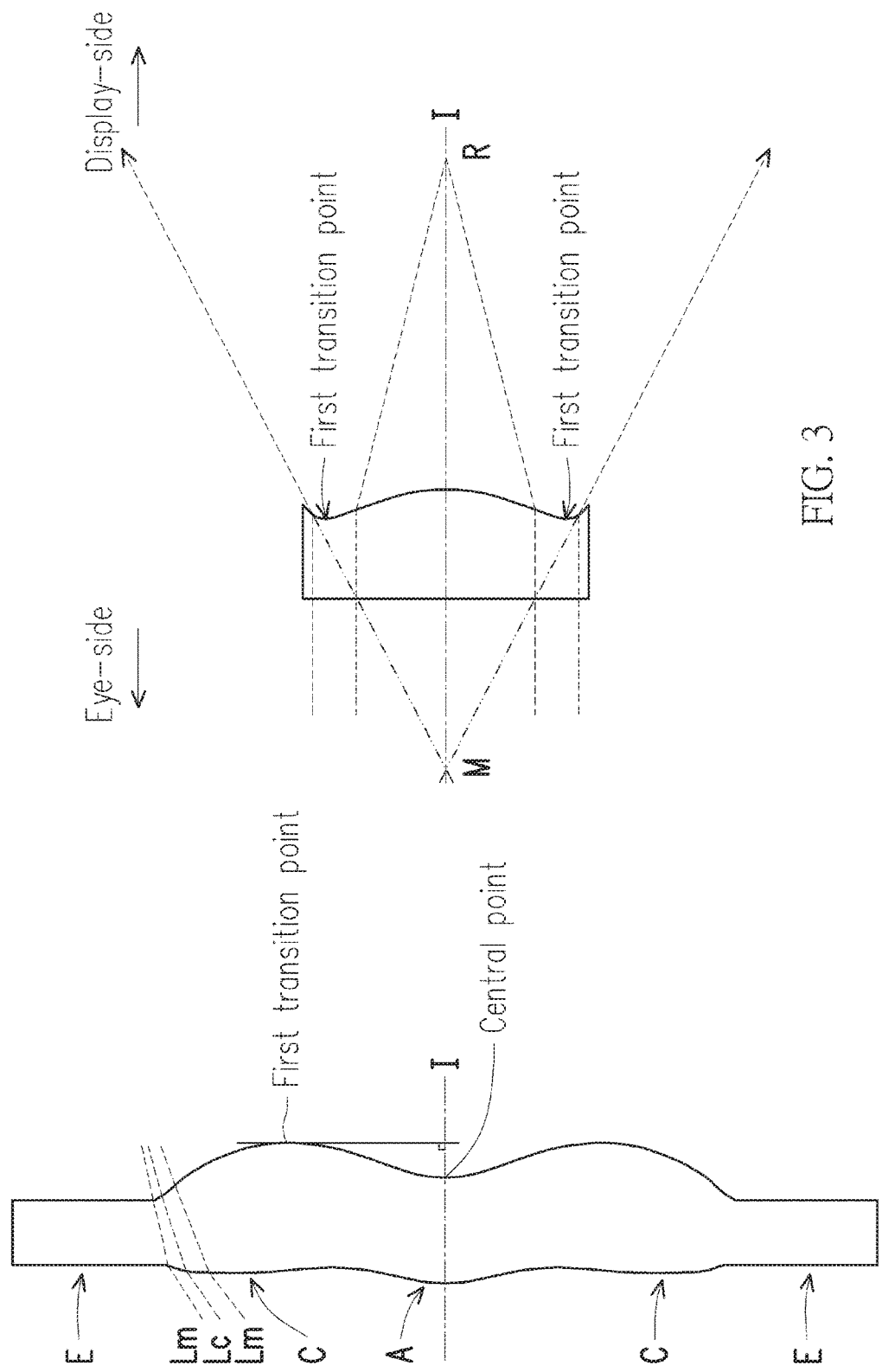

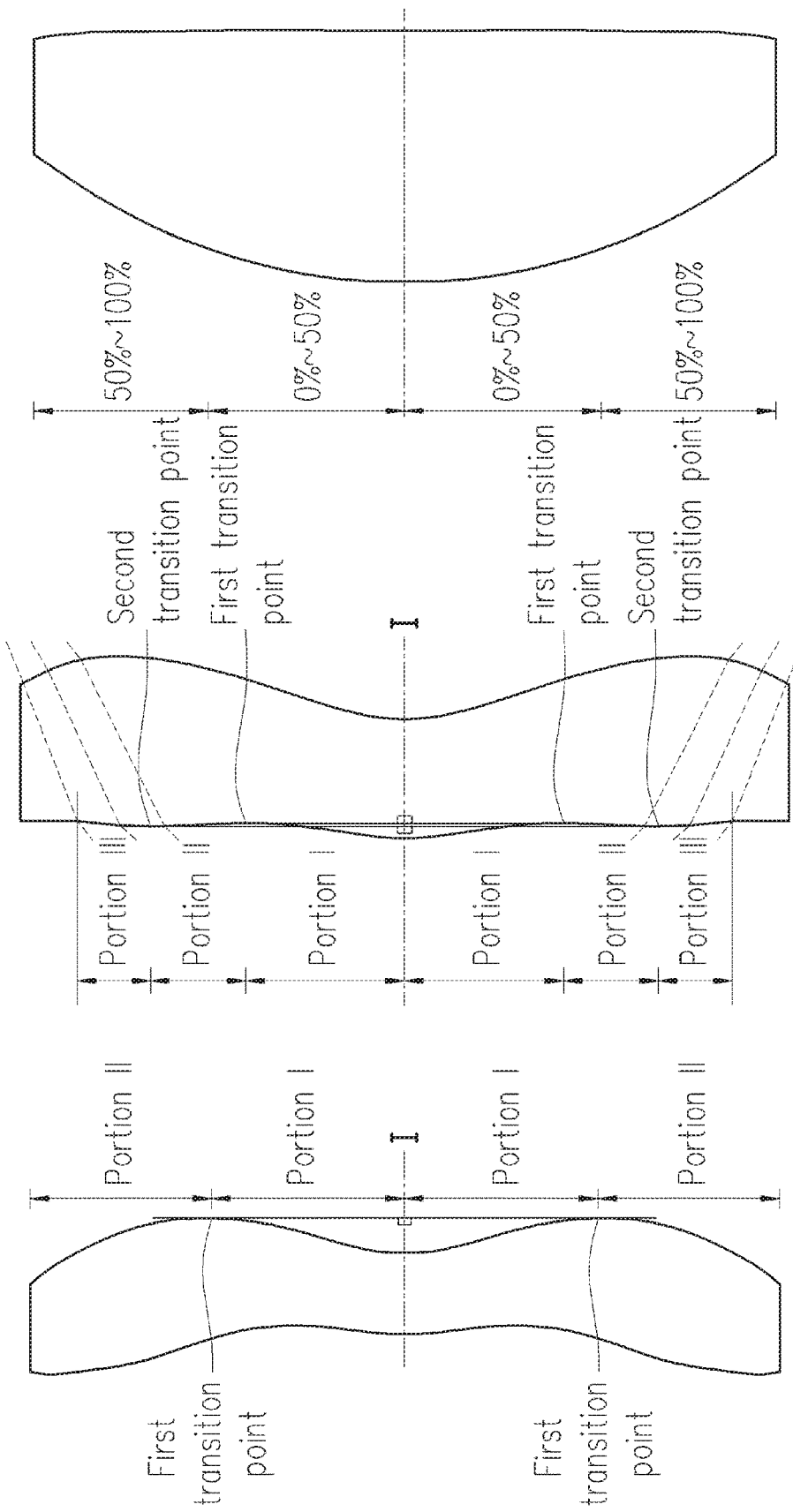

| Effective focal length (EFL) =85.974 mm, ω (Half apparent field of view) = 45 deg., TTL= 88.852 mm, Fno = 21.494 ||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 111 | 1st lens element | -48.6686 | 10.6163 | 15.3260 | 1.492 | 57.441 | 94.244 | Plastic |
| 112 | | -25.4470 | 0.0500 | 19.0120 | | | | |
| 121 | 2nd lens element | 67.5628 | 10.6143 | 24.3210 | 1.492 | 57.441 | 65.871 | Plastic |
| 122 | | -59.0092 | 0.0499 | 25.7410 | | | | |
| 131 | 3rd lens element | -97.9121 | 8.0000 | 25.8540 | 1.643 | 22.437 | -126.872 | Plastic |
| 132 | | 504.2368 | 17.0997 | 29.2260 | | | | |
| 141 | 4th lens element | -39.2931 | 8.0000 | 33.6920 | 1.492 | 57.441 | -68.078 | Plastic |
| 142 | | 241.4560 | 34.4220 | 39.5700 | | | | |
| 150 | Display screen | ∞ | | 55.3550 | | | | |

FIG. 9

| Aspherical parameters | | | | |
|---|---|---|---|---|
| Surface # | 111 | 112 | 121 | 122 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.120300E-05 | -4.300000E-06 | -6.460000E-06 | 1.119300E-05 |
| $a_6$ | -2.800000E-08 | 1.000000E-09 | 3.000000E-09 | -8.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 131 | 132 | 141 | 142 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 3.803000E-06 | 2.955000E-06 | 8.059000E-06 | -3.727000E-06 |
| $a_6$ | -4.000000E-09 | -3.000000E-09 | 0.000000E+00 | 0.000000E+00 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 10

| Effective focal length (EFL) =87.561 mm, ω (Half apparent field of view) = 45 deg., TTL= 119.528 mm, Fno = 21.890 | | | | | | | | |
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 211 | 1st lens element | -63.2588 | 26.2864 | 15.5850 | 1.492 | 57.441 | 120.207 | Plastic |
| 212 | | -34.7446 | 0.0500 | 27.0510 | | | | |
| 221 | 2nd lens element | 62.1297 | 38.3034 | 37.6150 | 1.492 | 57.441 | 66.421 | Plastic |
| 222 | | -54.8784 | 1.7861 | 39.5710 | | | | |
| 231 | 3rd lens element | -52.4701 | 8.0000 | 39.5350 | 1.643 | 22.437 | -81.550 | Plastic |
| 232 | | 71576.5401 | 10.3073 | 42.9170 | | | | |
| 241 | 4th lens element | -63.5066 | 8.0000 | 43.2790 | 1.492 | 57.441 | -95.233 | Plastic |
| 242 | | 185.7998 | 26.5250 | 46.3050 | | | | |
| 250 | Display screen | ∞ | | 52.1980 | | | | |

FIG. 13

| Aspherical parameters | | | | |
|---|---|---|---|---|
| Surface # | 211 | 212 | 221 | 222 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 3.646000E-06 | 1.123000E-06 | -7.750000E-07 | 3.105000E-06 |
| $a_6$ | -8.000000E-09 | 0.000000E+00 | 0.000000E+00 | -1.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 231 | 232 | 241 | 242 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 2.018000E-06 | 5.560000E-07 | 2.213000E-06 | -4.209000E-06 |
| $a_6$ | 0.000000E+00 | 0.000000E+00 | 0.000000E+00 | 1.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 14

| Effective focal length (EFL) =68.217 mm, ω (Half apparent field of view) = 45 deg., TTL= 85.782 mm, Fno = 17.054 ||||||||| 
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 311 | 1st lens element | -61.6007 | 16.0816 | 15.5970 | 1.492 | 57.441 | 84.667 | Plastic |
| 312 | | -26.9826 | 0.0500 | 21.6040 | | | | |
| 321 | 2nd lens element | 50.6465 | 22.7286 | 28.8860 | 1.492 | 57.441 | 51.304 | Plastic |
| 322 | | -42.8376 | 1.9614 | 30.3640 | | | | |
| 331 | 3rd lens element | -44.2535 | 8.0000 | 30.3600 | 1.643 | 22.437 | -68.833 | Plastic |
| 332 | | 2.335E+12 | 5.3604 | 34.0810 | | | | |
| 341 | 4th lens element | -47.3620 | 8.0000 | 34.1050 | 1.492 | 57.441 | -69.934 | Plastic |
| 342 | | 132.5810 | 23.6000 | 37.6280 | | | | |
| 350 | Display screen | ∞ | | 42.1380 | | | | |

FIG. 17

| Aspherical parameters | | | | |
|---|---|---|---|---|
| Surface # | 311 | 312 | 321 | 322 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 6.997000E-06 | 1.188000E-06 | -3.193000E-06 | 7.139000E-06 |
| $a_6$ | -1.800000E-08 | -1.000000E-09 | 0.000000E+00 | -3.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 331 | 332 | 341 | 342 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.907000E-06 | -1.354000E-06 | 5.787000E-06 | -4.786000E-06 |
| $a_6$ | 0.000000E+00 | 0.000000E+00 | 0.000000E+00 | 1.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 18

| Effective focal length (EFL) =66.794 mm, ω (Half apparent field of view) = 45 deg., TTL= 80.387 mm, Fno = 16.698 ||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 411 | 1st lens element | -56.3189 | 7.8735 | 15.7510 | 1.492 | 57.441 | 102.537 | Plastic |
| 412 | | -27.8309 | 0.0500 | 18.4080 | | | | |
| 421 | 2nd lens element | 50.2589 | 38.9771 | 24.2960 | 1.492 | 57.441 | 51.935 | Plastic |
| 422 | | -38.6539 | 0.4942 | 29.8500 | | | | |
| 431 | 3rd lens element | -56.3236 | 8.0000 | 29.9110 | 1.643 | 22.437 | -57.429 | Plastic |
| 432 | | 113.1405 | 9.2490 | 35.0170 | | | | |
| 441 | 4th lens element | -43.1459 | 8.0000 | 35.3680 | 1.492 | 57.441 | -58.741 | Plastic |
| 442 | | 92.7601 | 7.7430 | 40.6530 | | | | |
| 450 | Display screen | ∞ | | 41.2930 | | | | |

FIG. 21

| Aspherical parameters | | | | |
|---|---|---|---|---|
| Surface # | 411 | 412 | 421 | 422 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.568100E-05 | 7.305000E-06 | -3.041000E-06 | 9.113000E-06 |
| $a_6$ | -1.400000E-08 | 2.000000E-09 | 1.000000E-09 | -2.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 431 | 432 | 441 | 442 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.460000E-06 | -1.121000E-06 | 8.769000E-06 | -3.029000E-06 |
| $a_6$ | -1.000000E-09 | 0.000000E+00 | 0.000000E+00 | 0.000000E+00 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 22

| Effective focal length (EFL) =90.019 mm, ω (Half apparent field of view) = 45 deg., TTL= 91.980 mm, Fno = 22.505 ||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 511 | 1st lens element | -52.6471 | 10.9705 | 15.3730 | 1.492 | 57.441 | 87.467 | Plastic |
| 512 | | -25.2991 | 0.0500 | 19.1520 | | | | |
| 521 | 2nd lens element | 81.4984 | 10.9480 | 24.1930 | 1.492 | 57.441 | 73.190 | Plastic |
| 522 | | -61.6087 | 0.0500 | 25.8560 | | | | |
| 531 | 3rd lens element | -89.0954 | 8.0000 | 25.9270 | 1.643 | 22.437 | -134.858 | Plastic |
| 532 | | 3340.0914 | 17.9105 | 29.3640 | | | | |
| 541 | 4th lens element | -38.7719 | 8.0000 | 33.7070 | 1.492 | 57.441 | -68.534 | Plastic |
| 542 | | 275.3790 | 36.0510 | 40.4880 | | | | |
| 550 | Display screen | ∞ | | 58.9160 | | | | |

FIG. 25

| Aspherical parameters | | | | |
|---|---|---|---|---|
| Surface # | 511 | 512 | 521 | 522 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 7.722000E-06 | -4.441000E-06 | -6.095000E-06 | 9.869000E-06 |
| $a_6$ | -2.400000E-08 | 2.000000E-09 | 4.000000E-09 | -8.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 531 | 532 | 541 | 542 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 4.106000E-06 | 2.707000E-06 | 7.336000E-06 | -3.163000E-06 |
| $a_6$ | -5.000000E-09 | -3.000000E-09 | 0.000000E+00 | 0.000000E+00 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 26

| Effective focal length (EFL) =80.622 mm, ω (Half apparent field of view) = 45 deg., TTL= 107.340 mm, Fno = 20.156 |||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 611 | 1st lens element | -55.9686 | 21.2935 | 15.4420 | 1.492 | 57.441 | 105.167 | Plastic |
| 612 | | -30.2513 | 0.0500 | 24.3790 | | | | |
| 621 | 2nd lens element | 57.8828 | 33.9016 | 33.2350 | 1.492 | 57.441 | 61.275 | Plastic |
| 622 | | -50.7202 | 0.5939 | 35.7810 | | | | |
| 631 | 3rd lens element | -51.1762 | 8.0000 | 35.7660 | 1.643 | 22.437 | -79.601 | Plastic |
| 632 | | 1.479E+09 | 7.9232 | 39.4560 | | | | |
| 641 | 4th lens element | -54.6648 | 8.0000 | 39.6010 | 1.492 | 57.441 | -90.002 | Plastic |
| 642 | | 243.7925 | 27.5780 | 43.2010 | | | | |
| 650 | Display screen | ∞ | | 49.1880 | | | | |

FIG. 29

| Aspherical parameters | | | | |
|---|---|---|---|---|
| Surface # | 611 | 612 | 621 | 622 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 5.350000E-06 | 1.471000E-06 | -2.198000E-06 | 3.085000E-06 |
| $a_6$ | -1.400000E-08 | 0.000000E+00 | 0.000000E+00 | -1.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 631 | 632 | 641 | 642 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 2.302000E-06 | -1.480000E-07 | 3.283000E-06 | -2.787000E-06 |
| $a_6$ | -1.000000E-09 | 0.000000E+00 | 0.000000E+00 | 1.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 30

| Effective focal length (EFL) =77.674mm, ω (Half apparent field of view) = 45 deg., TTL= 90.787 mm, Fno = 19.419 ||||||||| 
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 13.0000 | 2.0000 | | | | |
| 711 | 1st lens element | -45.8972 | 6.9474 | 15.4380 | 1.492 | 57.441 | 153.456 | Plastic |
| 712 | | -29.9640 | 0.0500 | 18.0400 | | | | |
| 721 | 2nd lens element | 52.1878 | 41.3121 | 23.3960 | 1.492 | 57.441 | 54.847 | Plastic |
| 722 | | -41.2577 | 0.0499 | 31.3170 | | | | |
| 731 | 3rd lens element | -55.1948 | 8.0000 | 31.3310 | 1.643 | 22.437 | -85.852 | Plastic |
| 732 | | 2.043E+09 | 15.4373 | 36.5710 | | | | |
| 741 | 4th lens element | -48.2075 | 8.0000 | 40.1420 | 1.492 | 57.441 | -60.743 | Plastic |
| 742 | | 82.8371 | 10.9900 | 46.3030 | | | | |
| 750 | Display screen | ∞ | | 47.7520 | | | | |

FIG. 33

| Aspherical parameters | | | | |
|---|---|---|---|---|
| Surface # | 711 | 712 | 721 | 722 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.740600E-05 | 5.025000E-06 | -5.461000E-06 | 7.048000E-06 |
| $a_6$ | -1.800000E-08 | -8.000000E-09 | 1.000000E-09 | -3.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 731 | 732 | 741 | 742 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.178000E-06 | 7.100000E-08 | 5.153000E-06 | -3.251000E-06 |
| $a_6$ | -2.000000E-09 | -1.000000E-09 | 0.000000E+00 | 0.000000E+00 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 34

| Effective focal length (EFL) =71.684 mm, ω (Half apparent field of view) = 45 deg., TTL= 85.837 mm, Fno = 17.921 ||||||||
|---|---|---|---|---|---|---|---|---|
| Surface # | | Radius (mm) | Thickness (mm) | Semi-diameter | Refractive index | Abbe number | Focus (mm) | Material |
| P | A pupil of an observer | ∞ | 13.0000 | 2.0000 | | | | |
| 811 | 1st lens element | -56.6496 | 13.6997 | 15.5110 | 1.492 | 57.441 | 79.991 | Plastic |
| 812 | | -25.0675 | 0.0500 | 20.4050 | | | | |
| 821 | 2nd lens element | 57.6506 | 21.9181 | 26.4920 | 1.492 | 57.441 | 54.688 | Plastic |
| 822 | | -44.0936 | 0.0567 | 28.9720 | | | | |
| 831 | 3rd lens element | -73.4492 | 8.0000 | 28.9870 | 1.643 | 22.437 | -82.613 | Plastic |
| 832 | | 199.9983 | 5.4222 | 33.0550 | | | | |
| 841 | 4th lens element | -48.7294 | 8.0000 | 33.0900 | 1.492 | 57.441 | -65.091 | Plastic |
| 842 | | 98.3486 | 28.6900 | 37.1530 | | | | |
| 850 | Display screen | ∞ | | 46.4960 | | | | |

FIG. 37

| Aspherical parameters | | | | |
|---|---|---|---|---|
| Surface # | 811 | 812 | 821 | 822 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 8.991000E-06 | 1.945000E-06 | -5.261000E-06 | 8.410000E-06 |
| $a_6$ | -2.300000E-08 | 0.000000E+00 | 1.000000E-09 | -6.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 831 | 832 | 841 | 842 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -7.570000E-07 | -3.603000E-06 | 5.384000E-06 | -6.176000E-06 |
| $a_6$ | -3.000000E-09 | 0.000000E+00 | 0.000000E+00 | 2.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 38

| Effective focal length (EFL) =58.792 mm, ω (Half apparent field of view) = 45 deg., TTL= 79.592 mm, Fno = 14.698 ||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 14.8209 | 2.0000 | | | | |
| 911 | 1st lens element | -119.2699 | 18.6045 | 18.3610 | 1.492 | 57.441 | 74.315 | Plastic |
| 912 | | -29.4131 | 0.0517 | 24.2100 | | | | |
| 921 | 2nd lens element | 45.7826 | 25.5366 | 32.4260 | 1.492 | 57.441 | 49.203 | Plastic |
| 922 | | -41.8845 | 0.3108 | 32.6230 | | | | |
| 931 | 3rd lens element | -54.4222 | 10.0483 | 32.5860 | 1.643 | 22.437 | -50.037 | Plastic |
| 932 | | 84.3583 | 8.8721 | 34.6640 | | | | |
| 941 | 4th lens element | -41.6012 | 6.3743 | 34.7370 | 1.492 | 57.441 | -58.766 | Plastic |
| 942 | | 99.4367 | 9.7940 | 37.4000 | | | | |
| 950 | Display screen | ∞ | | 35.0120 | | | | |

FIG. 41

| Aspherical parameters | | | | |
|---|---|---|---|---|
| Surface # | 911 | 912 | 921 | 922 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.322500E-05 | 5.146000E-06 | -1.030000E-06 | 8.163000E-06 |
| $a_6$ | -1.400000E-08 | 5.000000E-09 | -1.000000E-09 | -2.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 931 | 932 | 941 | 942 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 2.776000E-06 | -1.496000E-06 | 1.072600E-05 | -3.913000E-06 |
| $a_6$ | -1.000000E-09 | 0.000000E+00 | 0.000000E+00 | 0.000000E+00 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 42

| Effective focal length (EFL) =58.916 mm, ω (Half apparent field of view) = 45 deg., TTL= 86.052 mm, Fno =14.729 |||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 9.9314 | 2.0000 | | | | |
| 10'11 | 1st lens element | -78.3508 | 18.9658 | 13.2740 | 1.492 | 57.441 | 76.378 | Plastic |
| 10'12 | | -27.4156 | 0.0500 | 20.8010 | | | | |
| 10'21 | 2nd lens element | 51.2438 | 30.1763 | 27.2650 | 1.492 | 57.441 | 48.454 | Plastic |
| 10'22 | | -35.8934 | 0.0500 | 29.2340 | | | | |
| 10'31 | 3rd lens element | -46.7171 | 13.5381 | 29.1720 | 1.643 | 22.437 | -46.568 | Plastic |
| 10'32 | | 92.8171 | 7.5409 | 33.5840 | | | | |
| 10'41 | 4th lens element | -41.6351 | 8.8296 | 33.6960 | 1.492 | 57.441 | -61.936 | Plastic |
| 10'42 | | 121.4009 | 6.9010 | 37.4000 | | | | |
| 10'50 | Display screen | ∞ | | 34.9880 | | | | |

FIG. 45

| Aspherical parameters | | | | |
|---|---|---|---|---|
| Surface # | 10'11 | 10'12 | 10'21 | 10'22 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 1.240900E-05 | 3.654000E-06 | -7.350000E-07 | 8.354000E-06 |
| $a_6$ | -1.600000E-08 | 2.000000E-09 | -1.000000E-09 | -1.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 10'31 | 10'32 | 10'41 | 10'42 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | 2.340000E-06 | -1.484000E-06 | 1.120700E-05 | -3.134000E-06 |
| $a_6$ | -1.000000E-09 | 0.000000E+00 | 0.000000E+00 | 0.000000E+00 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 46

| Effective focal length (EFL) =58.802 mm, ω (Half apparent field of view) = 45 deg., TTL= 82.337 mm, Fno = 14.700 ||||||||
|---|---|---|---|---|---|---|---|---|
| Surface # | | Radius (mm) | Thickness (mm) | Semi-diameter | Refractive index | Abbe number | Focus (mm) | Materia |
| P | A pupil of an observer | ∞ | 8.8133 | 2.0000 | | | | |
| 11'11 | 1st lens element | -31.2427 | 14.0960 | 11.1590 | 1.492 | 57.441 | 65.739 | Plastic |
| 11'12 | | -18.2515 | 1.4760 | 16.9620 | | | | |
| 11'21 | 2nd lens element | 75.7917 | 15.4446 | 24.0420 | 1.492 | 57.441 | 55.180 | Plastic |
| 11'22 | | -39.4314 | 0.0526 | 24.7590 | | | | |
| 11'31 | 3rd lens element | -88.8052 | 20.9648 | 24.7420 | 1.643 | 22.437 | -51.238 | Plastic |
| 11'32 | | 57.2034 | 9.9855 | 30.9210 | | | | |
| 11'41 | 4th lens element | -43.4712 | 7.9669 | 31.4230 | 1.492 | 57.441 | -78.913 | Plastic |
| 11'42 | | 383.6322 | 12.3510 | 33.6400 | | | | |
| 11'50 | Display screen | ∞ | | 35.0190 | | | | |

FIG. 49

| Aspherical parameters | | | | |
|---|---|---|---|---|
| Surface # | 11'11 | 11'12 | 11'21 | 11'22 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -3.747100E-05 | -5.952000E-06 | 2.687000E-06 | 8.293000E-06 |
| $a_6$ | -1.800000E-08 | -1.100000E-08 | 2.000000E-09 | -4.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 11'31 | 11'32 | 11'41 | 11'42 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -9.537000E-06 | -9.268000E-06 | 7.879000E-06 | -1.210700E-05 |
| $a_6$ | 2.000000E-09 | 3.000000E-09 | 0.000000E+00 | 4.000000E-09 |
| $a_8$ | 0.000000E+00 | 0.000000E+00 | 0.000000E+00 | 0.000000E+00 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 50

| Embodiment | 1st | 2nd | 3rd | 4th | 5th | 6th |
|---|---|---|---|---|---|---|
| T1 | 10.616 | 26.286 | 16.082 | 7.873 | 10.971 | 21.293 |
| G12 | 0.050 | 0.050 | 0.050 | 0.050 | 0.050 | 0.050 |
| T2 | 10.614 | 38.303 | 22.729 | 38.977 | 10.948 | 33.902 |
| G23 | 0.050 | 1.786 | 1.961 | 0.494 | 0.050 | 0.594 |
| T3 | 8.000 | 8.000 | 8.000 | 8.000 | 8.000 | 8.000 |
| G34 | 17.100 | 10.307 | 5.360 | 9.249 | 17.911 | 7.923 |
| T4 | 8.000 | 8.000 | 8.000 | 8.000 | 8.000 | 8.000 |
| G4D | 34.422 | 26.525 | 23.600 | 7.743 | 36.051 | 27.578 |
| EFL | 85.974 | 87.561 | 68.217 | 66.794 | 90.019 | 80.622 |
| TTL | 88.852 | 119.258 | 85.782 | 80.387 | 91.980 | 107.340 |
| TL | 54.430 | 92.733 | 62.182 | 72.644 | 55.929 | 79.762 |
| AAG | 17.200 | 12.143 | 7.372 | 9.793 | 18.011 | 8.567 |
| ALT | 37.231 | 80.590 | 54.810 | 62.851 | 37.919 | 71.195 |
| EPD | 4.000 | 4.000 | 4.000 | 4.000 | 4.000 | 4.000 |
| ER | 13.000 | 13.000 | 13.000 | 13.000 | 13.000 | 13.000 |
| DLD | 110.730 | 104.354 | 84.234 | 82.506 | 117.852 | 98.334 |
| TL/ER | 4.187 | 7.133 | 4.783 | 5.588 | 4.302 | 6.136 |
| T1/(G23+G34) | 0.619 | 2.174 | 2.196 | 0.808 | 0.611 | 2.500 |
| (T1+T3)/T4 | 2.327 | 4.286 | 3.010 | 1.984 | 2.371 | 3.662 |
| ALT/AAG | 2.165 | 6.637 | 7.435 | 6.418 | 2.105 | 8.310 |
| EFL/G4D | 2.498 | 3.301 | 2.891 | 8.626 | 2.497 | 2.923 |
| TTL/ER | 6.835 | 9.174 | 6.599 | 6.184 | 7.075 | 8.257 |
| (T1+G12+T2)/(T3+G34+T4) | 0.643 | 2.457 | 1.819 | 1.858 | 0.648 | 2.309 |
| (T3+T4)/G34 | 0.936 | 1.552 | 2.985 | 1.730 | 0.893 | 2.019 |
| T2/T1 | 1.000 | 1.457 | 1.413 | 4.950 | 0.998 | 1.592 |
| T2/(G23+G34) | 0.619 | 3.167 | 3.104 | 4.000 | 0.610 | 3.980 |
| T1/G34 | 0.621 | 2.550 | 3.000 | 0.851 | 0.613 | 2.687 |
| EFL/AAG | 4.999 | 7.211 | 9.254 | 6.820 | 4.998 | 9.411 |

FIG. 51

| Embodiment | 7th | 8th | 9th | 10th | 11th |
|---|---|---|---|---|---|
| T1 | 6.947 | 13.700 | 18.604 | 18.966 | 14.096 |
| G12 | 0.050 | 0.050 | 0.052 | 0.050 | 1.476 |
| T2 | 41.312 | 21.918 | 25.537 | 30.176 | 15.445 |
| G23 | 0.050 | 0.057 | 0.311 | 0.050 | 0.053 |
| T3 | 8.000 | 8.000 | 10.048 | 13.538 | 20.965 |
| G34 | 15.437 | 5.422 | 8.872 | 7.541 | 9.985 |
| T4 | 8.000 | 8.000 | 6.374 | 8.830 | 7.967 |
| G4D | 10.990 | 28.690 | 9.794 | 6.901 | 12.351 |
| EFL | 77.674 | 71.684 | 58.792 | 58.916 | 58.802 |
| TTL | 90.787 | 85.837 | 79.592 | 86.052 | 82.337 |
| TL | 79.797 | 57.147 | 69.798 | 79.151 | 69.986 |
| AAG | 15.537 | 5.529 | 9.235 | 7.641 | 11.514 |
| ALT | 64.260 | 51.618 | 60.564 | 71.510 | 58.472 |
| EPD | 4.000 | 4.000 | 4.000 | 4.000 | 4.000 |
| ER | 13.000 | 13.000 | 14.821 | 9.931 | 8.813 |
| DLD | 95.468 | 92.958 | 70.004 | 69.942 | 70.002 |
| TL/ER | 6.138 | 4.396 | 4.709 | 7.970 | 7.941 |
| T1/(G23+G34) | 0.449 | 2.500 | 2.026 | 2.499 | 1.404 |
| (T1+T3)/T4 | 1.868 | 2.712 | 4.495 | 3.681 | 4.401 |
| ALT/AAG | 4.136 | 9.336 | 6.558 | 9.359 | 5.078 |
| EFL/G4D | 7.068 | 2.499 | 6.003 | 8.537 | 4.761 |
| TTL/ER | 6.984 | 6.603 | 5.370 | 8.665 | 9.342 |
| (T1+G12+T2)/(T3+G34+T4) | 1.537 | 1.665 | 1.747 | 1.645 | 0.797 |
| (T3+T4)/G34 | 1.036 | 2.951 | 1.851 | 2.966 | 2.897 |
| T2/T1 | 5.946 | 1.600 | 1.373 | 1.591 | 1.096 |
| T2/(G23+G34) | 2.668 | 4.000 | 2.781 | 3.975 | 1.539 |
| T1/G34 | 0.450 | 2.527 | 2.097 | 2.515 | 1.412 |
| EFL/AAG | 4.999 | 12.965 | 6.367 | 7.711 | 5.107 |

FIG. 51A

OCULAR OPTICAL SYSTEM

CROSS REFERENCE TO RELATED APPLICATION

This application claims priority to P.R.C. Patent Application No. 201710021201.3, filed Jan. 11, 2017, with the State Intellectual Property Office of the People's Republic of China (SIPO), which is incorporated herein by its entirety.

TECHNICAL FIELD

The present disclosure relates to an ocular optical system, and particularly, to an ocular optical system having four lens elements.

BACKGROUND

Technology improves every day, continuously expanding consumer demand for increasingly compact electronic devices. This applies in the context of ocular optical system characteristics, in that key components for ocular optical systems incorporated into consumer electronic products should keep pace with technological improvements in order to meet the expectations of consumers. Some important characteristics of an ocular optical system include image quality and size. Improvements in image sensor technology play an important role in maintaining (or improving) consumer expectations related to image quality while making the devices more compact. However, a conventional ocular optical system has some drawbacks, such as an angle of view being too small and/or astigmatism and distortion aberrations being too large. Moreover, reducing the size of an imaging lens while maintaining and/or improving optical characteristics presents challenging problems.

In this manner, there is a continuing need for improving design characteristics of an ocular optical system that may have a larger angle of view while simultaneously maintaining and/or improving imaging quality.

SUMMARY

The present disclosure provides for an ocular optical system. By controlling convex and/or concave surface of lens elements, the length of the ocular optical system may be shortened while maintaining good optical characteristics and system functionality.

In the present disclosure, parameters used herein may be chosen from but not limited to parameters listed below:

| Parameter | Definition |
|---|---|
| T1 | The central thickness of the first lens element along the optical axis |
| G12 | The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G4D | The air gap between the fourth lens element and a display screen along the optical axis |
| EFL | The effective focal length of the ocular optical system |
| TTL | The distance between the eye-side surface of the first lens element and the display screen along the optical axis |
| TL | The distance between the eye-side surface of the first lens element and the display-side surface of the fourth lens element along the optical axis |
| SL | The distance between the pupil of the observer and the display screen along the optical axis |
| ER | The distance between the pupil of the observer and the eye-side surface of the first lens element along the optical axis |
| EPD | The exit pupil diameter of the ocular optical system |
| DLD | The diagonal length of the display screen corresponding to one single pupil of the observer |
| n1 | The refracting index of the first lens element |
| n2 | The refracting index of the second lens element |
| n3 | The refracting index of the third lens element |
| n4 | The refracting index of the fourth lens element |
| v1 | The Abbe number of the first lens element |
| v2 | The Abbe number of the second lens element |
| v3 | The Abbe number of the third lens element |
| v4 | The Abbe number of the fourth lens element |
| ω | Half apparent field of view |
| Fno | F-number of the ocular optical system |
| ALT | The sum of the central thicknesses of the first to the fourth lens element |
| AAG | The sum of all air gaps from the first lens element to the fourth lens element along the optical axis |

In one embodiment, an ocular optical system may comprise, sequentially from an eye-side to a display-side along an optical axis, first, second, third, and fourth lens elements. Additionally, the lens elements may comprise an eye-side surface facing toward the eye-side, an display-side surface facing toward the display-side, and a central thickness defined along the optical axis. The display-side surface of the second lens element may comprise a convex portion in a vicinity of the optical axis. The display-side surface of the third lens element may comprise a concave portion in a vicinity of the optical axis. The eye-side surface of the fourth lens element may comprise a concave portion in a vicinity of the optical axis.

In the other embodiments, some parameters may be taken into consideration, and may be controlled to satisfy at least one of the inequalities as follows:

$$0 \le TL/ER \le 8;$$

$$T1/(G23+G34) \le 2.5;$$

$$(T1+T3)/T4 \le 4.5;$$

$$ALT/AAG \le 10;$$

$$EFL/G4D \ge 2.4;$$

In one embodiment, an ocular optical system may comprise, sequentially from an eye-side to a display-side along an optical axis, first, second, third, and fourth lens elements. Additionally, the lens elements may comprise an eye-side surface facing toward the eye-side, an display-side surface facing toward the display-side, and a central thickness defined along the optical axis. The second lens element may have positive refracting power. The display-side surface of the third lens element may comprise a concave portion in a vicinity of the optical axis. The eye-side surface of the fourth lens element may comprise a concave portion in a vicinity of the optical axis.

In the other embodiments, some parameters may be taken into consideration, and may be controlled to satisfy at least one of the inequalities as follows:

$0 \leq TTL/ER \leq 10;$ $ALT/AAG \leq 10;$ $(T1+G12+T2)/(T3+G34+T4) \leq 2.5;$ $(T3+T4)/G34 \leq 3.0;$ In one embodiment, an ocular optical system may comprise, sequentially from an eye-side to a display-side along an optical axis, first, second, third, and fourth lens elements. Additionally, the lens elements may comprise an eye-side surface facing toward the eye-side, an display-side surface facing toward the display-side, and a central thickness defined along the optical axis. The display-side surface of the first lens element may comprise a convex portion in a vicinity of the optical axis. The display-side surface of the third lens element may comprise a concave portion in a vicinity of the optical axis. The eye-side surface of the fourth lens element may comprise a concave portion in a vicinity of the optical axis.

In the other embodiments, some parameters may be taken into consideration, and may be controlled to satisfy at least one of the inequalities as follows:

$T2/T1 \geq 0.9;$ $0 \leq TL/ER \leq 8;$ $T2/(G23+G34) \leq 4.0;$ $T1/G34 \leq 3.0;$ $EFL/AAG \geq 4.9.$ Embodiments according to the present disclosure are not limited and could be selectively incorporated in other embodiments described herein. In some embodiments, more details about the parameters could be incorporated to enhance the control for the system performance and/or resolution. It is noted that the details listed here could be incorporated into example embodiments if no inconsistency occurs.

BRIEF DESCRIPTION OF THE DRAWINGS

Exemplary embodiments will be more readily understood from the following detailed description when read in conjunction with the appended drawing, in which:

FIG. 2 depicts a cross-sectional view of one single lens element according to the present disclosure;

FIG. 3 depicts a schematic view of the relation between the surface shape and the optical focus of the lens element;

FIG. 4 depicts a schematic view of a first example of the surface shape and the effective radius of the lens element;

FIG. 5 depicts a schematic view of a second example of the surface shape and the effective radius of the lens element;

FIG. 6 depicts a schematic view of a third example of the surface shape and the effective radius of the lens element;

FIG. 9 depicts a table of optical data for each lens element of the ocular optical system of a first embodiment of the present disclosure;

FIG. 10 depicts a table of aspherical data of a first embodiment of the ocular optical system according to the present disclosure;

FIG. 13 depicts a table of optical data for each lens element of the ocular optical system of a second embodiment of the present disclosure;

FIG. 14 depicts a table of aspherical data of a second embodiment of the ocular optical system according to the present disclosure;

FIG. 17 depicts a table of optical data for each lens element of the ocular optical system of a third embodiment of the present disclosure;

FIG. 18 depicts a table of aspherical data of a third embodiment of the ocular optical system according to the present disclosure;

FIG. 21 depicts a table of optical data for each lens element of the ocular optical system of a fourth embodiment of the present disclosure;

FIG. 22 depicts a table of aspherical data of a fourth embodiment of the ocular optical system according to the present disclosure;

FIG. 25 depicts a table of optical data for each lens element of the ocular optical system of a fifth embodiment of the present disclosure;

FIG. 26 depicts a table of aspherical data of a fifth embodiment of the ocular optical system according to the present disclosure;

FIG. 29 depicts a table of optical data for each lens element of a sixth embodiment of an ocular optical system according to the present disclosure;

FIG. 30 depicts a table of aspherical data of a sixth embodiment of the ocular optical system according to the present disclosure;

FIG. 33 depicts a table of optical data for each lens element of the ocular optical system of a seventh embodiment of the present disclosure;

FIG. 34 depicts a table of aspherical data of a seventh embodiment of the ocular optical system according to the present disclosure;

FIG. 37 depicts a table of optical data for each lens element of the ocular optical system of an eighth embodiment of the present disclosure;

FIG. 38 depicts a table of aspherical data of an eighth embodiment of the ocular optical system according to the present disclosure;

FIG. 41 depicts a table of optical data for each lens element of the ocular optical system of a ninth embodiment of the present disclosure;

FIG. 42 depicts a table of aspherical data of a ninth embodiment of the ocular optical system according to the present disclosure;

FIG. 45 depicts a table of optical data for each lens element of the ocular optical system of a tenth embodiment of the present disclosure;

FIG. 46 depicts a table of aspherical data of a tenth embodiment of the ocular optical system according to the present disclosure;

FIG. 49 depicts a table of optical data for each lens element of the ocular optical system of a eleventh embodiment of the present disclosure;

FIG. 50 depicts a table of aspherical data of a eleventh embodiment of the ocular optical system according to the present disclosure; and FIG. 51 and FIG. 51A are tables for the values of T1, T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the disclosed embodiments.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
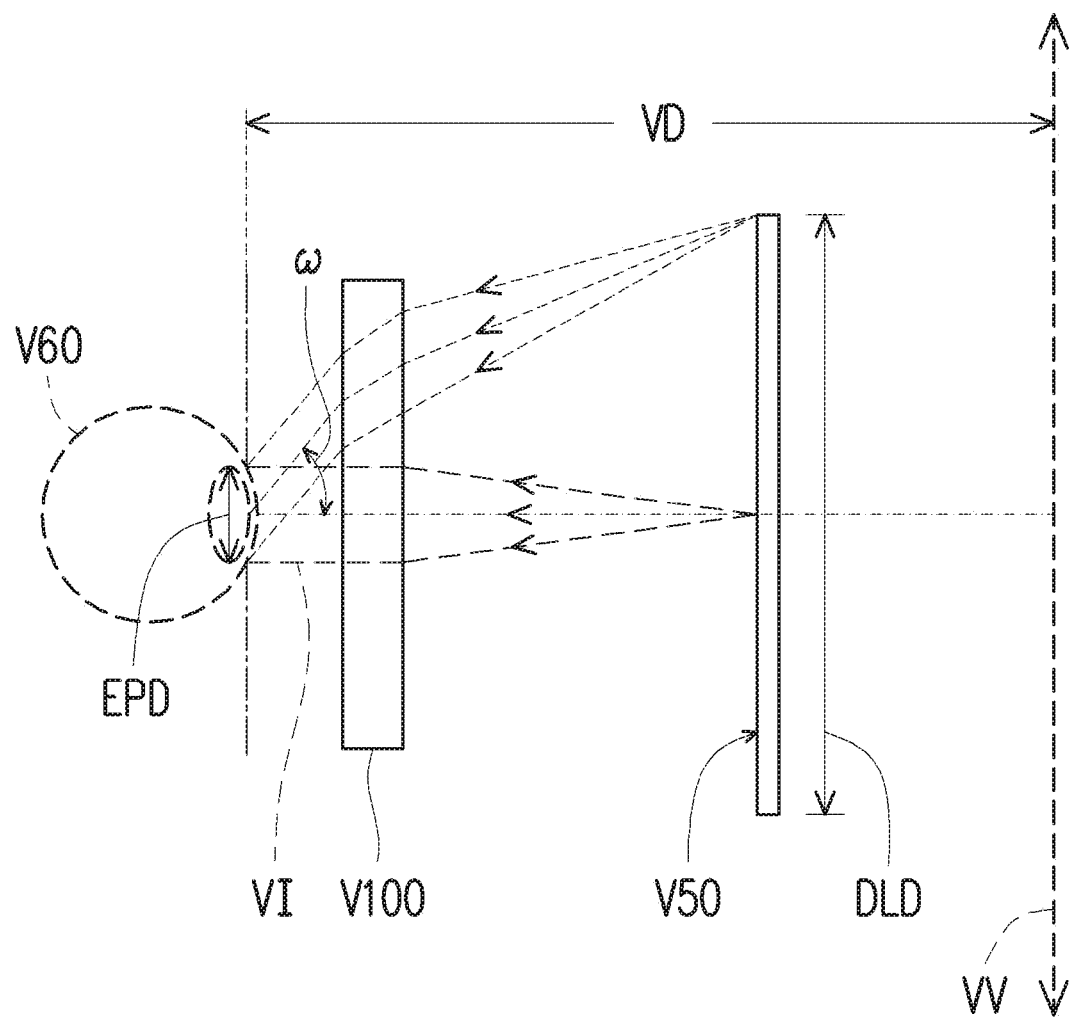
FIG. 1 depicts a schematic view of an ocular optical system according to the present disclosure.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a least distance of distinct vision VD, as depicted in FIG. 1. The following criteria for determining optical specifications of the present application are based on an assumption that a reverse tracking of the ray direction is parallel to imaging rays passing through the ocular optical system from an eye-side and focused on the display screen for imaging.

In the present specification, the description "a lens element having positive refracting power (or negative refracting power)" means that the paraxial refracting power of the lens element in Gaussian optics is positive (or negative). The description "An eye-side (or display-side) surface of a lens element" only includes a specific region of that surface of the lens element where imaging rays are capable of passing through that region, namely the clear aperture of the surface. The aforementioned imaging rays can be classified into two types, namely chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". The lens element may also have an extending portion E extended radially and outwardly from the region C, namely the portion outside of the clear aperture of the lens element. The extending portion E is usually used for physically assembling the lens element into an ocular optical system. Under normal circumstances, the imaging rays would not pass through the extending portion E because those imaging rays may only pass through the clear aperture. The structures and shapes of the aforementioned extending portion E are examples for technical explanation, and so the structures and shapes of lens elements should not be limited to these examples. Note that the extending portions of the lens element surfaces depicted in the following embodiments may be partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (e.g., the closest one to the optical axis), the second transition point, and the Nth transition point (e.g., the farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, e.g., the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, e.g., the focal point of the ray is at the eye-side (see point M in FIG. 3), that portion will be determined as having a concave shape. Therefore, referring to FIG. 3, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis may have a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the eye-side or the display-side.

For all, some, and/or none of the transition point examples, as well as examples that do not include transition points, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is defined as having a concave surface due to the R value at the display-side surface of the lens element is positive. The shape of the portion in a vicinity of a periphery of the lens element is different from that of the radially inner adjacent portion, e.g., the shape of the portion in a vicinity of a periphery of the lens element is different from the shape of the portion in a vicinity of the optical axis; the portion in a vicinity of a periphery of the lens element may have a convex shape.

Referring to the second example depicted in FIG. 5, a first transition point and a second transition point exist on the eye-side surface (within the clear aperture) of a lens element. In which portion I is the portion in a vicinity of the optical axis, and portion III is the portion in a vicinity of a periphery of the lens element. The portion in a vicinity of the optical axis may have a convex shape because the R value at the eye-side surface of the lens element is positive. The portion in a vicinity of a periphery of the lens element (portion III) may have a convex shape. What is more, there is another portion having a concave shape existing between the first and second transition point (portion II).

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

Figure 7:
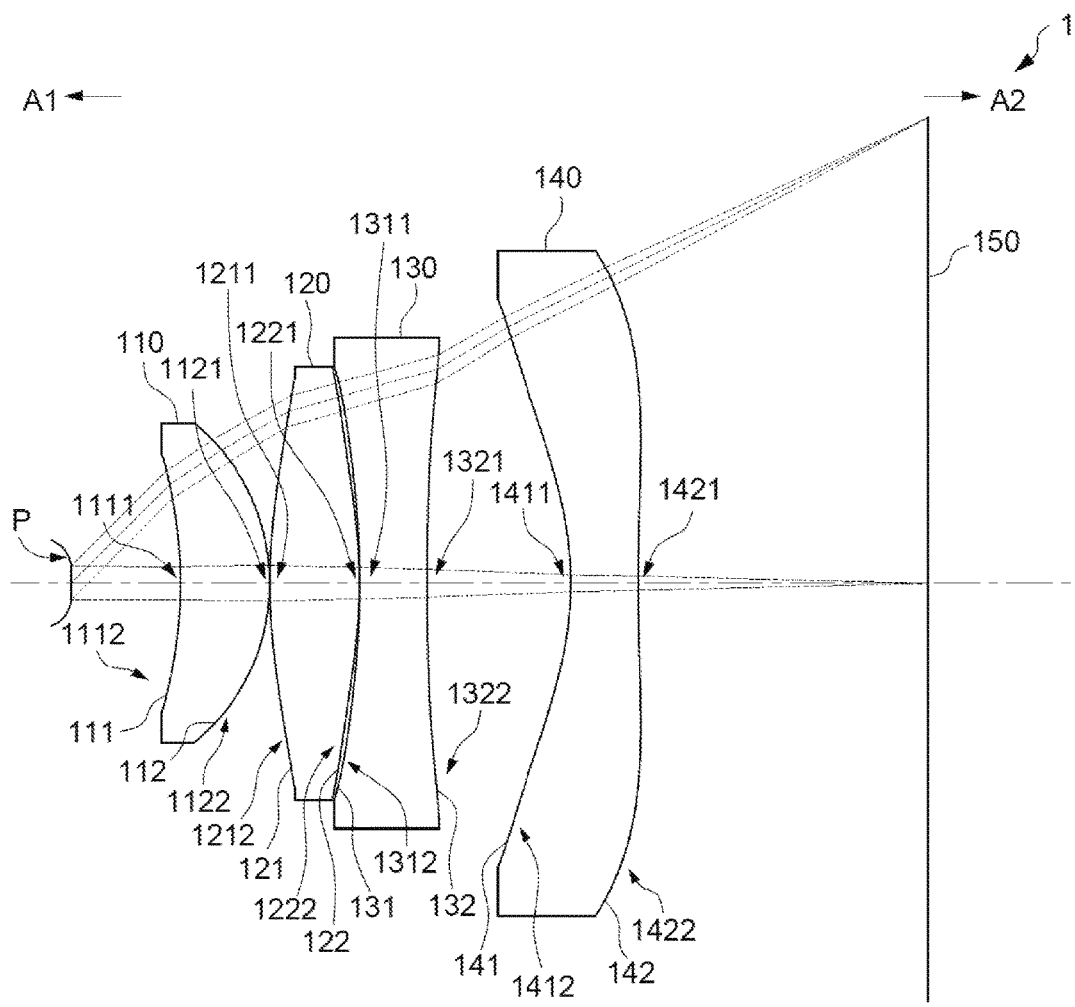
FIG. 7 depicts a cross-sectional view of a first embodiment of an ocular optical system having four lens elements according to the present disclosure.
Figure 8:
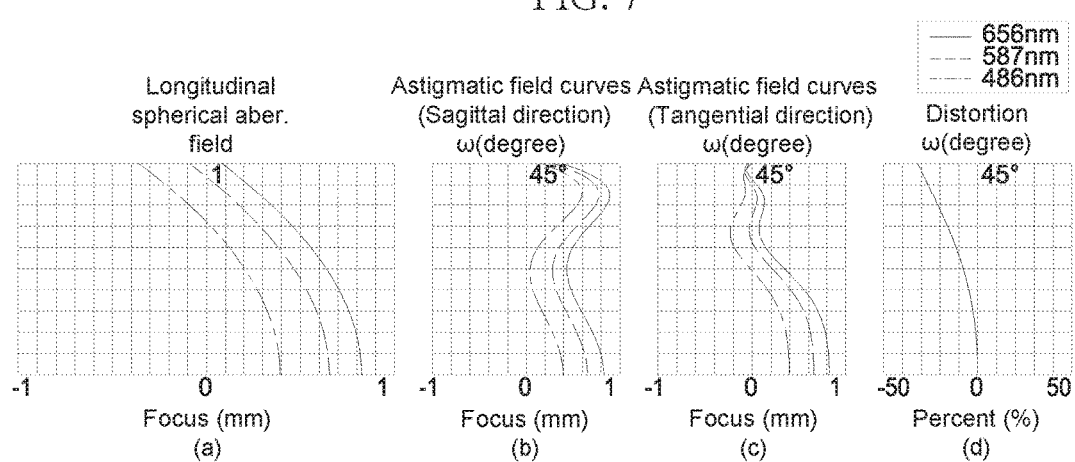
FIG. 8 depicts a chart of longitudinal spherical aberration and other kinds of optical aberrations of a first embodiment of the ocular optical system according to the present disclosure.

Several exemplary embodiments and associated optical data will now be provided to illustrate non-limiting examples of ocular optical system systems having good optical characteristics and a shortened length. Reference is now made to FIGS. 7-10. FIG. 7 illustrates an example cross-sectional view of an ocular optical system 1 having four lens elements according to a first example embodiment. FIG. 8 shows example charts of longitudinal spherical aberration and other kinds of optical aberrations of the ocular optical system 1 according to the first example embodiment. FIG. 9 illustrates an example table of optical data of each lens element of the ocular optical system 1 according to the first example embodiment. FIG. 10 depicts an example table of aspherical data of the ocular optical system 1 according to the first example embodiment. An ocular optical system according to the first embodiment of the disclosure is used for imaging of imaging rays entering an eye of an observer via the ocular optical system and a pupil of the eye of the observer P from a display screen.

As shown in FIG. 7, the ocular optical system 1 of the present embodiment may comprise, in order from an eye-side A1 to an display-side A2 along an optical axis, a first lens element 110, a second lens element 120, a third lens element 130, and a fourth lens element 140. A display screen 150 is positioned at the display-side A2 of the ocular optical system 1. Each of the first, second, third, and fourth lens elements 110, 120, 130, 140 may comprise an eye-side surface 111/121/131/141 facing toward the eye-side A1 and an display-side surface 112/122/132/142 facing toward the display-side A2.

Exemplary embodiments of each lens element of the ocular optical system 1 will now be described with reference to the drawings. The lens elements of the ocular optical system 1 are constructed using plastic material, in some embodiments.

An example embodiment of the first lens element 110 may have positive refracting power. The eye-side surface 111 may comprise a concave portion 1111 in a vicinity of an optical axis and a concave portion 1112 in a vicinity of a periphery of the first lens element 110. The display-side surface 112 may comprise a convex portion 1121 in a vicinity of the optical axis and a convex portion 1122 in a vicinity of the periphery of the first lens element 110. The eye-side surface 111 and the display-side surface 112 may be aspherical surfaces.

An example embodiment of the second lens element 120 may have positive refracting power. The eye-side surface 121 may comprise a convex portion 1211 in a vicinity of the optical axis and a convex portion 1212 in a vicinity of a periphery of the second lens element 120. The display-side surface 122 may comprise a convex portion 1221 in a vicinity of the optical axis and a convex portion 1222 in a vicinity of the periphery of the second lens element 120. The eye-side surface 121 and the display-side surface 122 may be aspherical surfaces.

An example embodiment of the third lens element 130 may have negative refracting power. The eye-side surface 131 may comprise a concave portion 1311 in a vicinity of the optical axis and a concave portion 1312 in a vicinity of a periphery of the third lens element 130. The display-side surface 132 may comprise a concave portion 1321 in a vicinity of the optical axis and a concave portion 1322 in a vicinity of the periphery of the third lens element 130. The eye-side surface 131 and the display-side surface 132 may be aspherical surfaces.

An example embodiment of the fourth lens element 140 may have negative refracting power. The eye-side surface 141 may comprise a concave portion 1411 in a vicinity of the optical axis and a concave portion 1412 in a vicinity of a periphery of the fourth lens element 140. The display-side surface 142 may comprise a concave portion 1421 in a vicinity of the optical axis and a convex portion 1422 in a vicinity of the periphery of the fourth lens element 140. The eye-side surface 141 and the display-side surface 142 may be aspherical surfaces.

In example embodiments, air gaps exist between the lens elements 110, 120, 130, 140, and the display screen 150. For example, FIG. 7 illustrates the air gap d1 existing between the first lens element 110 and the second lens element 120, the air gap d2 existing between the second lens element 120 and the third lens element 130, the air gap d3 existing between the third lens element 130 and the fourth lens element 140, and the air gap d4 existing between the fourth lens element 140 and the display screen 150. However, in other embodiments, any of the air gaps may or may not exist. For example, the profiles of opposite surfaces of any two adjacent lens elements may correspond to each other, and in such situation, the air gap may not exist. As used throughout, the air gap d1 is denoted by G12, the air gap d2 is denoted by G23, the air gap d3 is denoted by G34, the air gap d4 is denoted by G4D, and the sum of d1, d2, and d3 is denoted by AAG. FIG. 9 depicts the optical characteristics of each lens elements in the ocular optical system 1 of the present embodiment.

The aspherical surfaces including the eye-side surface 111 of the first lens element 110, the display-side surface 112 of the first lens element 110, the eye-side surface 121 and the display-side surface 122 of the second lens element 120, the eye-side surface 131 and the display-side surface 132 of the third lens element 130, the eye-side surface 141 and the display-side surface 142 of the fourth lens element 140 are all defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 10.

FIG. 8(a) shows the longitudinal spherical aberration, wherein the horizontal axis of FIG. 8(a) defines the focus, and the vertical axis of FIG. 8(a) defines the field of view. FIG. 8(b) shows the astigmatism aberration in the sagittal direction, wherein the horizontal axis of FIG. 8(b) defines the focus, and the vertical axis of FIG. 8(b) defines the half apparent field of view. FIG. 8(c) shows the astigmatism aberration in the tangential direction, wherein the horizontal axis of FIG. 8(c) defines the focus, and the vertical axis of FIG. 8(c) defines the half apparent field of view. FIG. 8(d) shows the variation of the distortion aberration, wherein the horizontal axis of FIG. 8(d) defines the percentage, and the vertical axis of FIG. 8(d) defines the half apparent field of view. The three curves with different wavelengths (486 nm, 587 nm, 656 nm) represent that off-axis light with respect to these wavelengths may be focused around an image point. From the vertical deviation of each curve shown in FIG. 8(a), the offset of the off-axis light relative to the image point may be within about ±0.9 mm. Therefore, the first embodiment may improve the longitudinal spherical aberration with respect to different wavelengths. Referring to FIG. 8(b), the focus variation with respect to the three different wavelengths (486 nm, 587 nm, 656 nm) in the whole field may fall within about ±0.9 mm. Referring to FIG. 8(c), the focus variation with respect to the three different wavelengths (486 nm, 587 nm, 656 nm) in the whole field may fall within about ±0.9 mm. Referring to FIG. 8(d), the horizontal axis of FIG. 8(d), the variation of the distortion aberration may be within about ±35%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

ω may be about 45.000 degrees, Fno may be about 21.494, and SL may be about 101.852 mm. The value of Fno is calculated based on the reversibility of light. In this embodiment, the eye-side works as an object-side, and the display-side works as an image-side, and a pupil of one eye of an observer P works as a pupil of an incident light. Of course, the other embodiments described hereafter may use the basis to calculate the value of Fno.

Figure 11:
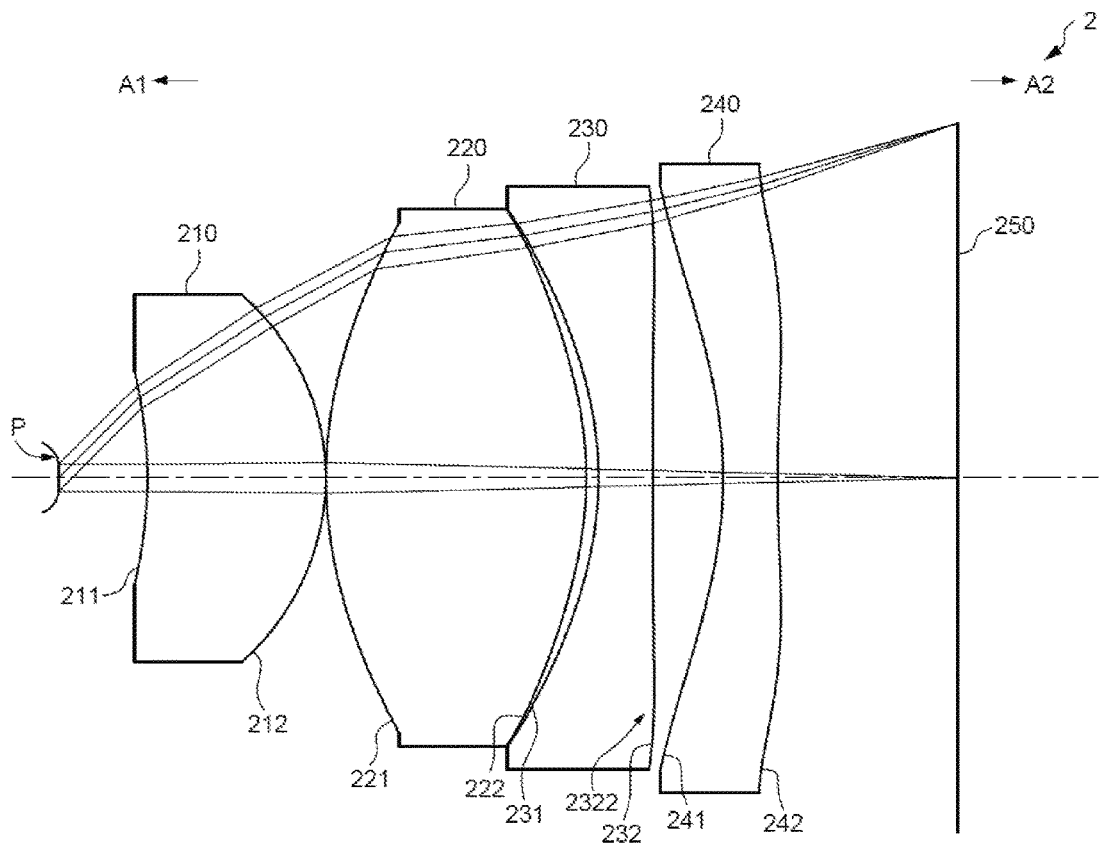
FIG. 11 depicts a cross-sectional view of a second embodiment of an ocular optical system having four lens elements according to the present disclosure.
Figure 12:
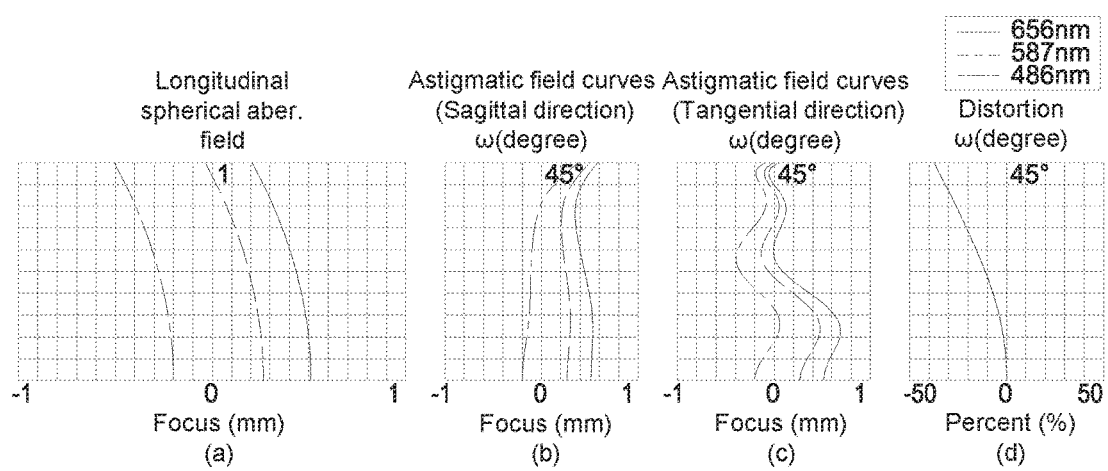
FIG. 12 depicts a chart of longitudinal spherical aberration and other kinds of optical aberrations of a second embodiment of the ocular optical system according the present disclosure.

Reference is now made to FIGS. 11-14. FIG. 11 illustrates an example cross-sectional view of an ocular optical system 2 having four lens elements according to a second example embodiment. FIG. 12 shows example charts of longitudinal spherical aberration and other kinds of optical aberrations of the ocular optical system 2 according to the second example embodiment. FIG. 13 shows an example table of optical data of each lens element of the ocular optical system 2 according to the second example embodiment. FIG. 14 shows an example table of aspherical data of the ocular optical system 2 according to the second example embodiment. The reference numbers labeled in the present embodiment are similar to those in the first embodiment for the similar elements, but here the reference numbers are initialed with 2, for example, reference number 231 for labeling the eye-side surface of the third lens element 230, reference number 232 for labeling the display-side surface of the third lens element 230, etc.

As shown in FIG. 11, the ocular optical system 2 of the present embodiment, in an order from an eye-side A1 to an display-side A2 along an optical axis, may comprise a first lens element 210, a second lens element 220, a third lens element 230, and a fourth lens element 240.

The arrangement of the convex or concave surface structures, including the eye-side surfaces 211, 221, 231, and 241 and the display-side surfaces 212, 222, and 242, are generally similar to the ocular optical system 1. The differences between the ocular optical system 1 and the ocular optical system 2 may include the convex or concave surface structure of the display-side surface 232 of the third lens element 230. Additional differences may include a radius of curvature, a thickness, an aspherical data, and an effective focal length of each lens element. More specifically, the display-side surface 232 of the third lens element 230 may comprise a convex portion 2322 in a vicinity of a periphery of the third lens element 230.

Here, for clearly showing the drawings of the present embodiment, only the surface shapes which are different from that in the first embodiment are labeled. Please refer to FIG. 13 for the optical characteristics of each lens element in the ocular optical system 2 of the present embodiment.

From the vertical deviation of each curve shown in FIG. 12(a), the offset of the off-axis light relative to the image point may be within about ±0.6 mm. Referring to FIG. 12(b), the focus variation with respect to the three different wavelengths (486 nm, 587 nm, 656 nm) in the whole field may fall within about ±0.6 mm. Referring to FIG. 12(c), the focus variation with respect to the three different wavelengths (486 nm, 587 nm, 656 nm) in the whole field may fall within about ±0.8 mm. Referring to FIG. 12(d), the variation of the distortion aberration of the ocular optical system 2 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the second embodiment, ω may be about 45.000 degrees, Fno may be about 21.890, and SL may be about 132.258 mm. In comparison with the first embodiment, the optical aberrations may be smaller and the yield rate may be higher.

Figure 15:
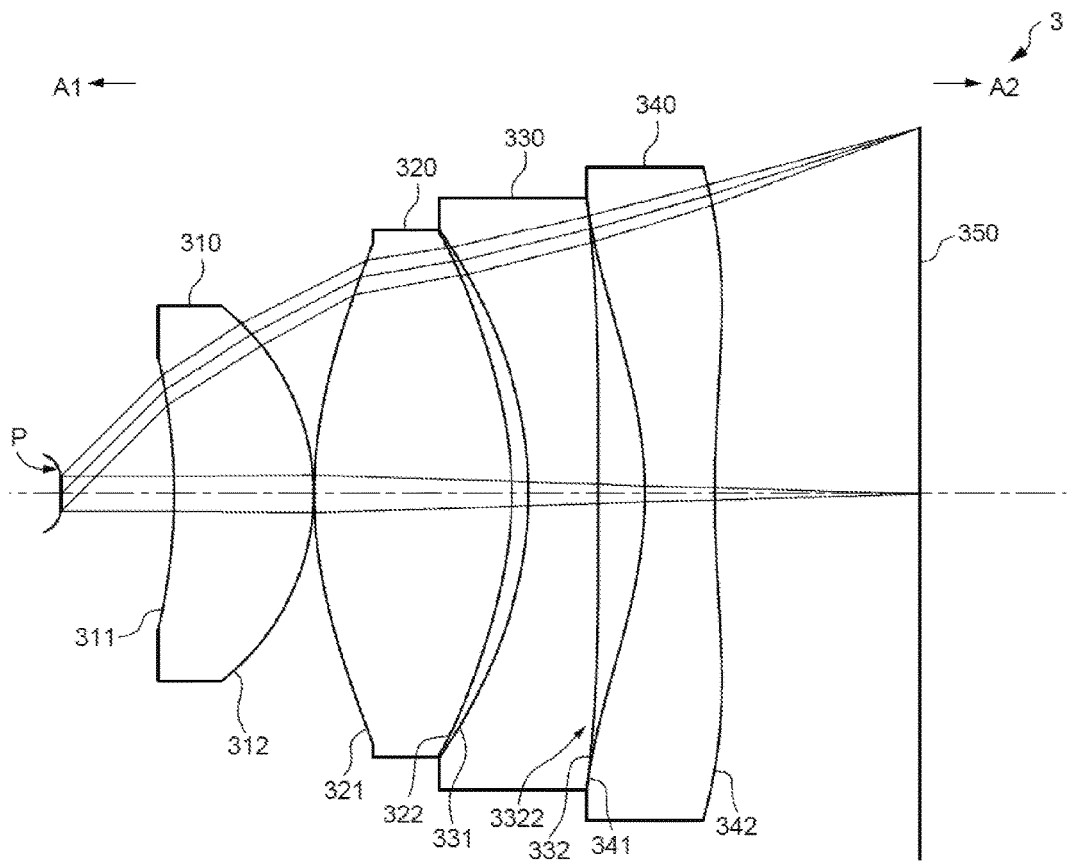
FIG. 15 depicts a cross-sectional view of a third embodiment of an ocular optical system having four lens elements according to the present disclosure.
Figure 16:
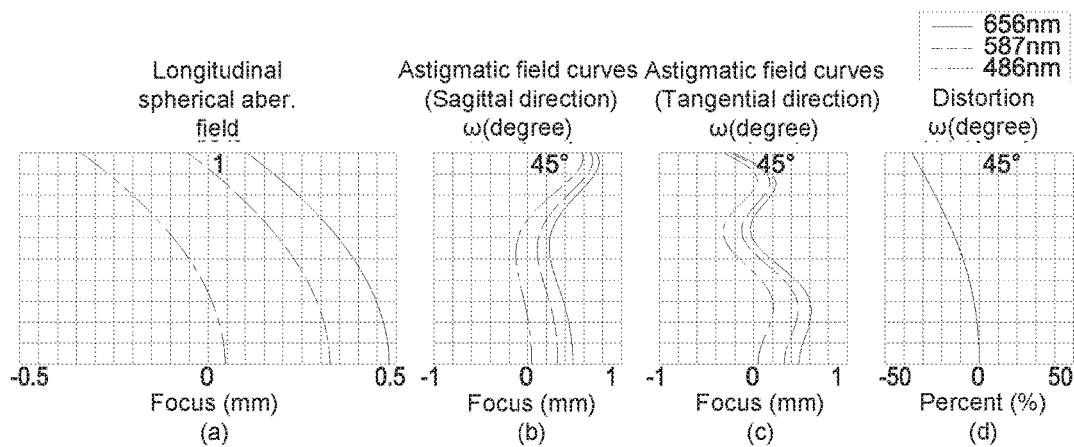
FIG. 16 depicts a chart of longitudinal spherical aberration and other kinds of optical aberrations of a third embodiment of the ocular optical system according the present disclosure.

Reference is now made to FIGS. 15-18. FIG. 15 illustrates an example cross-sectional view of an ocular optical system 3 having four lens elements according to a third example embodiment. FIG. 16 shows example charts of longitudinal spherical aberration and other kinds of optical aberrations of the ocular optical system 3 according to the third example embodiment. FIG. 17 shows an example table of optical data of each lens element of the ocular optical system 3 according to the third example embodiment. FIG. 18 shows an example table of aspherical data of the ocular optical system 3 according to the third example embodiment. The reference numbers labeled in the present embodiment are similar to those in the first embodiment for the similar elements, but here the reference numbers are initialed with 3, for example, reference number 331 for labeling the eye-side surface of the third lens element 330, reference number 332 for labeling the display-side surface of the third lens element 330, etc.

As shown in FIG. 15, the ocular optical system 3 of the present embodiment, in an order from an eye-side A1 to an display-side A2 along an optical axis, may comprise a first lens element 310, a second lens element 320, a third lens element 330, and a fourth lens element 340.

The arrangement of the convex or concave surface structures, including the eye-side surfaces 311, 321, 331, and 341 and the display-side surfaces 312, 322, and 342 are generally similar to the ocular optical system 1 of FIG. 7. The differences between the ocular optical system 1 of FIG. 7 and the ocular optical system 3 of FIG. 15 may include the convex or concave surface structure of the display-side surface 332 of the third lens element 330. Additional differences may include a radius of curvature, a thickness, aspherical data, and an effective focal length of each lens element. More specifically, the display-side surface 332 of the third lens element 330 may comprise a convex portion 3322 in a vicinity of a periphery of the third lens element 330.

Here, for clearly showing the drawings of the present embodiment, only the surface shapes which are different from that in the first embodiment are labeled. Please refer to FIG. 17 for the optical characteristics of each lens element in the ocular optical system 3 of the present embodiment.

From the vertical deviation of each curve shown in FIG. 16(a), the offset of the off-axis light relative to the image point may be within about ±0.5 mm. Referring to FIG. 16(b), the focus variation with respect to the three different wavelengths (486 nm, 587 nm, 656 nm) in the whole field may fall within about ±0.8 mm. Referring to FIG. 16(c), the focus variation with respect to the three different wavelengths (486 nm, 587 nm, 656 nm) in the whole field may fall within about ±0.6 mm. Referring to FIG. 16(d), the variation of the distortion aberration of the ocular optical system 3 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the third embodiment, ω may be about 45.000 degrees, Fno may be about 17.054, and SL may be about 98.782 mm. In comparison with the first embodiment, the optical aberrations, Fno and SL may be smaller.

Figure 19:
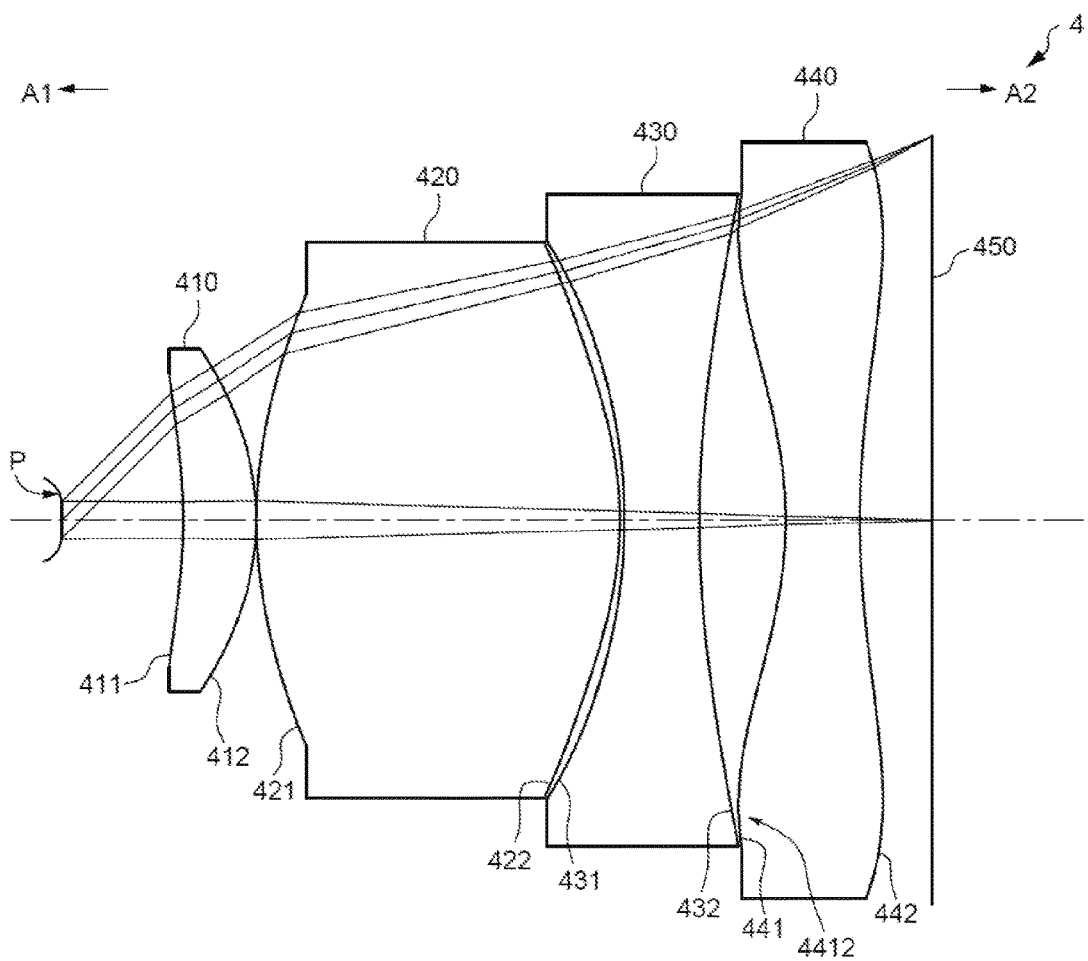
FIG. 19 depicts a cross-sectional view of a fourth embodiment of an ocular optical system having four lens elements according to the present disclosure.
Figure 20:
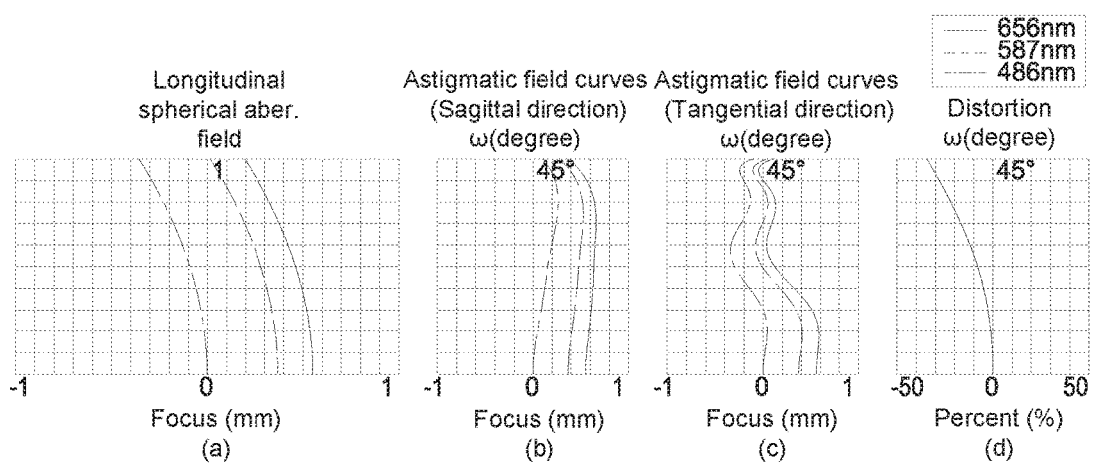
FIG. 20 depicts a chart of longitudinal spherical aberration and other kinds of optical aberrations of a fourth embodiment of the ocular optical system according the present disclosure.

Reference is now made to FIGS. 19-22. FIG. 19 illustrates an example cross-sectional view of an ocular optical system 4 having four lens elements according to a fourth example embodiment. FIG. 20 shows example charts of longitudinal spherical aberration and other kinds of optical aberrations of the ocular optical system 4 according to the fourth embodiment. FIG. 21 shows an example table of optical data of each lens element of the ocular optical system 4 according to the fourth example embodiment. FIG. 22 shows an example table of aspherical data of the ocular optical system 4 according to the fourth example embodiment. The reference numbers labeled in the present embodiment are similar to those in the first embodiment for the similar elements, but here the reference numbers are initialed with 4, for example, reference number 431 for labeling the eye-side surface of the third lens element 430, reference number 432 for labeling the display-side surface of the third lens element 430, etc.

As shown in FIG. 19, the ocular optical system 4 of the present embodiment, in an order from an eye-side A1 to an display-side A2 along an optical axis, may comprise a first lens element 410, a second lens element 420, a third lens element 430, and a fourth lens element 440.

The arrangement of the convex or concave surface structures, including the eye-side surfaces 411, 421, and 431 and the display-side surfaces 412, 422, 432, and 442 are generally similar to the ocular optical system 1. The differences between the ocular optical system 1 and the ocular optical system 4 may include the convex or concave surface structure of the eye-side surface 441 of the fourth lens element 440. Additional differences may include a radius of curvature, a thickness, an aspherical data, and an effective focal length of each lens element. More specifically, the eye-side surface 441 of the fourth lens element 440 may comprise a convex portion 4412 in a vicinity of a periphery of the fourth lens element 440.

Here, for clearly showing the drawings of the present embodiment, only the surface shapes which are different from that in the first embodiment are labelled. Please refer to FIG. 21 for the optical characteristics of each lens elements in the ocular optical system 4 of the present embodiment.

From the vertical deviation of each curve shown in FIG. 20(a), the offset of the off-axis light relative to the image point may be within about ±0.6 mm. Referring to FIG. 20(b), the focus variation with respect to the three different wavelengths (486 nm, 587 nm, 656 nm) in the whole field may fall within about ±0.7 mm. Referring to FIG. 20(c), the focus variation with respect to the three different wavelengths (486 nm, 587 nm, 656 nm) in the whole field may fall within about ±0.6 mm. Referring to FIG. 20(d), the variation of the distortion aberration of the ocular optical system 4 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the fourth embodiment, ω may be about 45.000 degrees, Fno may be about 16.698, and SL may be about 93.387 mm. In comparison with the first embodiment, the optical aberrations, Fno and SL may be smaller.

Figure 23:
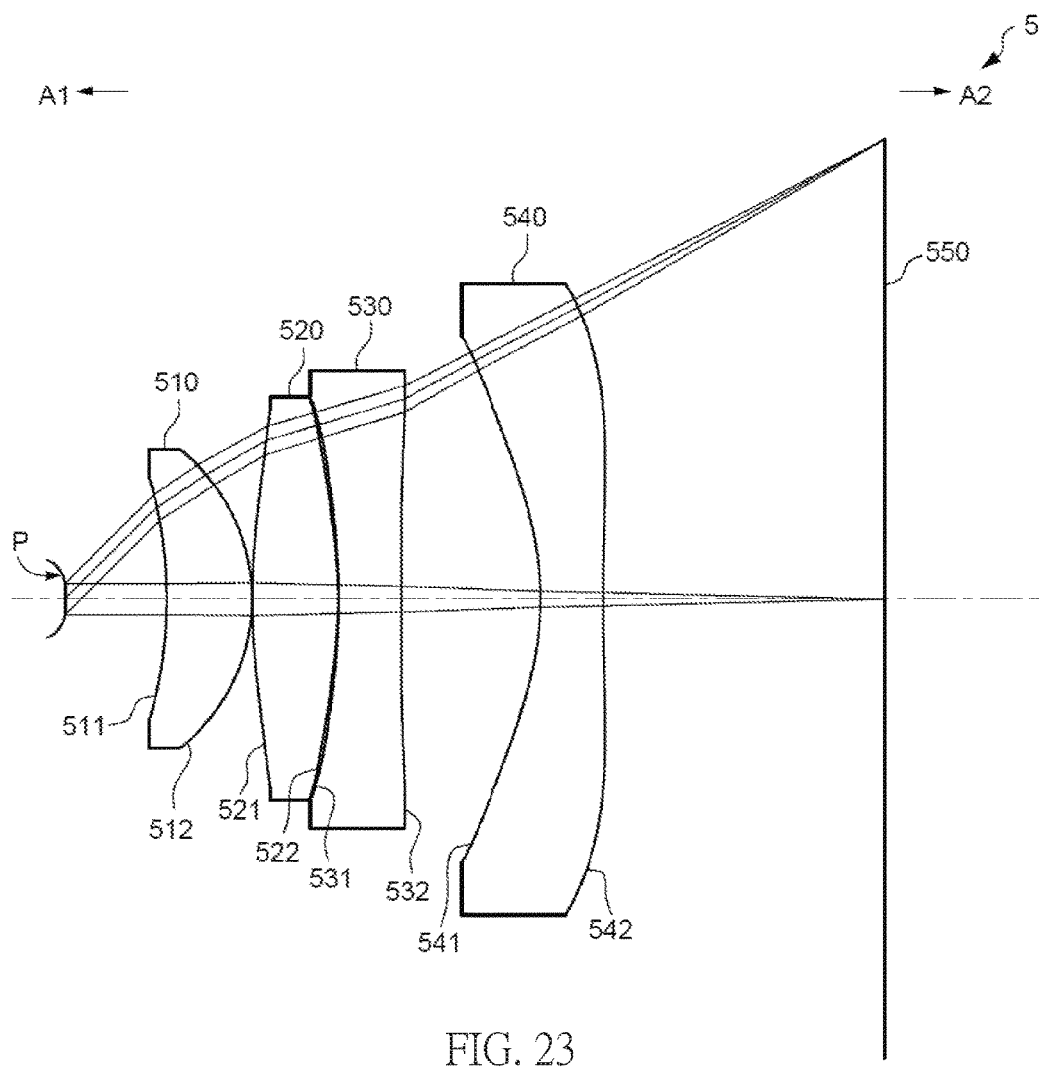
FIG. 23 depicts a cross-sectional view of a fifth embodiment of an ocular optical system having four lens elements according to the present disclosure.
Figure 24:
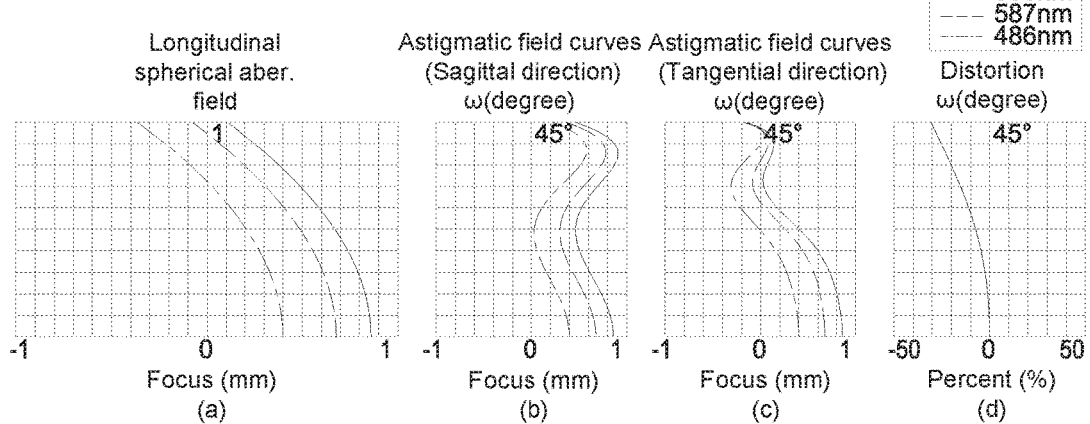
FIG. 24 depicts a chart of longitudinal spherical aberration and other kinds of optical aberrations of a fifth embodiment of the ocular optical system according the present disclosure.

Reference is now made to FIGS. 23-26. FIG. 23 illustrates an example cross-sectional view of an ocular optical system 5 having four lens elements according to a fifth example embodiment. FIG. 24 shows example charts of longitudinal spherical aberration and other kinds of optical aberrations of the ocular optical system 5 according to the fifth embodiment. FIG. 25 shows an example table of optical data of each lens element of the ocular optical system 5 according to the fifth example embodiment. FIG. 26 shows an example table of aspherical data of the ocular optical system 5 according to the fifth example embodiment. The reference numbers labeled in the present embodiment are similar to those in the first embodiment for the similar elements, but here the reference numbers are initialed with 5, for example, reference number 531 for labeling the eye-side surface of the third lens element 530, reference number 532 for labeling the display-side surface of the third lens element 530, etc.

As shown in FIG. 23, the ocular optical system 5 of the present embodiment, in an order from an eye-side A1 to an display-side A2 along an optical axis, may comprise a first lens element 510, a second lens element 520, a third lens element 530, and a fourth lens element 540.

The arrangement of the convex or concave surface structures, including the eye-side surfaces 511, 521, 531, and 541 and the display-side surfaces 512, 522, 532, and 542 are generally similar to the ocular optical system 1. The differences may include a radius of curvature, the thickness, aspherical data, and the effective focal length of each lens element.

Here, for clearly showing the drawings of the present embodiment, only the surface shapes which are different from that in the first embodiment are labeled. FIG. 25 depicts the optical characteristics of each lens elements in the ocular optical system 5 of the present embodiment.

From the vertical deviation of each curve shown in FIG. 24(a), the offset of the off-axis light relative to the image point may be within about ±0.9 mm. Referring to FIG. 24(b), the focus variation with respect to the three different wavelengths (486 nm, 587 nm, 656 nm) in the whole field may fall within about ±0.9 mm. Referring to FIG. 24(c), the focus variation with respect to the three different wavelengths (486 nm, 587 nm, 656 nm) in the whole field may fall within about ±0.9 mm. Referring to FIG. 24(d), the variation of the distortion aberration of the ocular optical system 5 may be within about ±30%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the fifth embodiment, ω may be about 45.000 degrees, Fno may be about 22.505, and SL may be about 104.980 mm. In comparison with the first embodiment, the yield rate may be higher.

Figure 27:
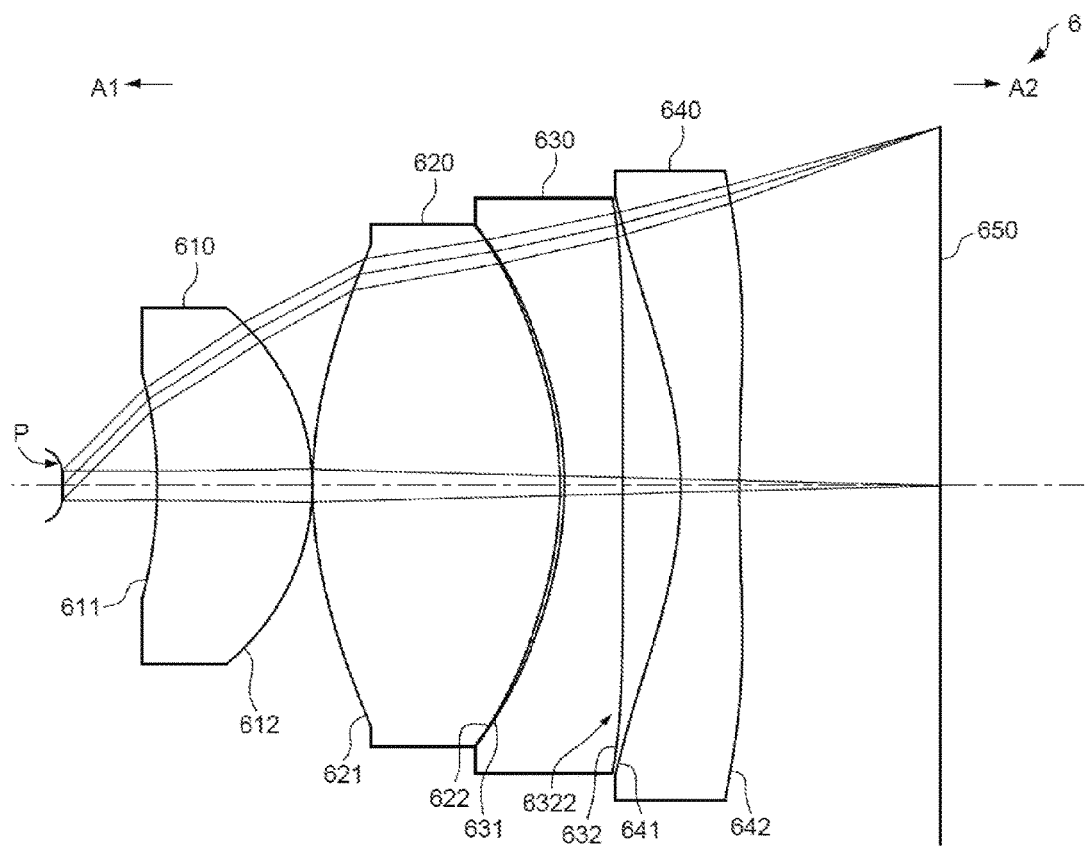
FIG. 27 depicts a cross-sectional view of a sixth embodiment of an ocular optical system having four lens elements according to the present disclosure.
Figure 28:
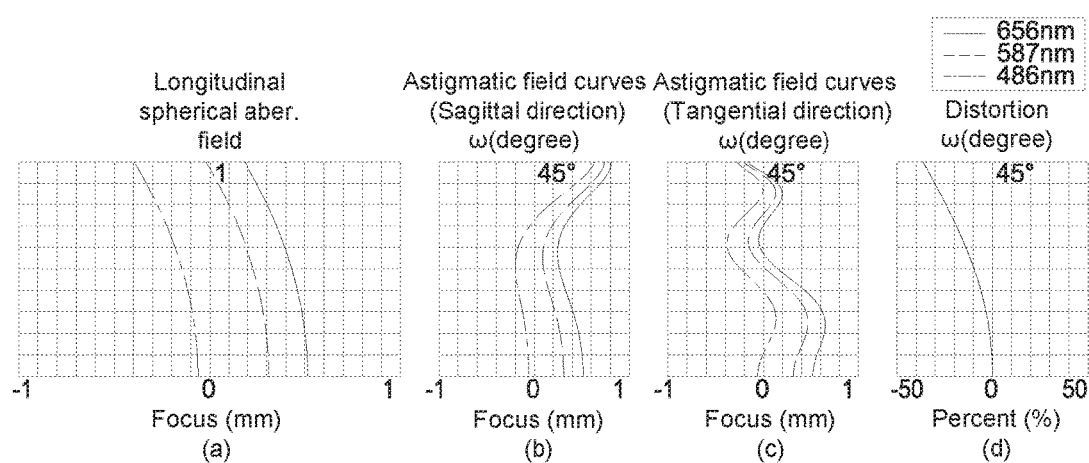
FIG. 28 depicts a chart of longitudinal spherical aberration and other kinds of optical aberrations of a sixth embodiment of the ocular optical system according to the present disclosure.

Reference is now made to FIGS. 27-30. FIG. 27 illustrates an example cross-sectional view of an ocular optical system 6 having four lens elements according to a sixth example embodiment. FIG. 28 shows example charts of longitudinal spherical aberration and other kinds of optical aberrations of the ocular optical system 6 according to the sixth embodiment. FIG. 29 shows an example table of optical data of each lens element of the ocular optical system 6 according to the sixth example embodiment. FIG. 30 shows an example table of aspherical data of the ocular optical system 6 according to the sixth example embodiment. The reference numbers labeled in the present embodiment are similar to those in the first embodiment for the similar elements, but here the reference numbers are initialed with 6, for example, reference number 631 for labeling the eye-side surface of the third lens element 630, reference number 632 for labeling the display-side surface of the third lens element 630, etc.

As shown in FIG. 27, the ocular optical system 6 of the present embodiment, in an order from an eye-side A1 to an display-side A2 along an optical axis, may comprise a first lens element 610, a second lens element 620, a third lens element 630, and a fourth lens element 640.

The arrangement of the convex or concave surface structures, including the eye-side surfaces 611, 621, 631, and 641 and the display-side surfaces 612, 622, and 642 are generally similar to the ocular optical system 1. The differences between the ocular optical system 1 and the ocular optical system 6 may include the concave or convex shapes of the display-side surface 632. Additional differences may include a radius of curvature, a thickness, aspherical data, and an effective focal length of each lens element. More specifically, the display-side surface 632 of the third lens element 630 may comprise a convex portion 6322 in a vicinity of a periphery of the third lens element 630.

Here, for clearly showing the drawings of the present embodiment, only the surface shapes which are different from that in the first embodiment are labelled. Please refer to FIG. 29 for the optical characteristics of each lens elements in the ocular optical system 6 of the present embodiment.

From the vertical deviation of each curve shown in FIG. 28(a), the offset of the off-axis light relative to the image point may be within about ±0.5 mm. Referring to FIG. 28(b), the focus variation with respect to the three different wavelengths (486 nm, 587 nm, 656 nm) in the whole field may fall within about ±0.8 mm. Referring to FIG. 28(c), the focus variation with respect to the three different wavelengths (486 nm, 587 nm, 656 nm) in the whole field may fall within about ±0.7 mm. Referring to FIG. 28(d), the variation of the distortion aberration of the ocular optical system 6 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34 and EFL/AAG of the present embodiment.

In the sixth embodiment, ω may be about 45.000 degrees, Fno may be about 20.156, and SL may be about 120.340 mm. In comparison with the first embodiment, the optical aberrations and Fno may be smaller.

Figure 31:
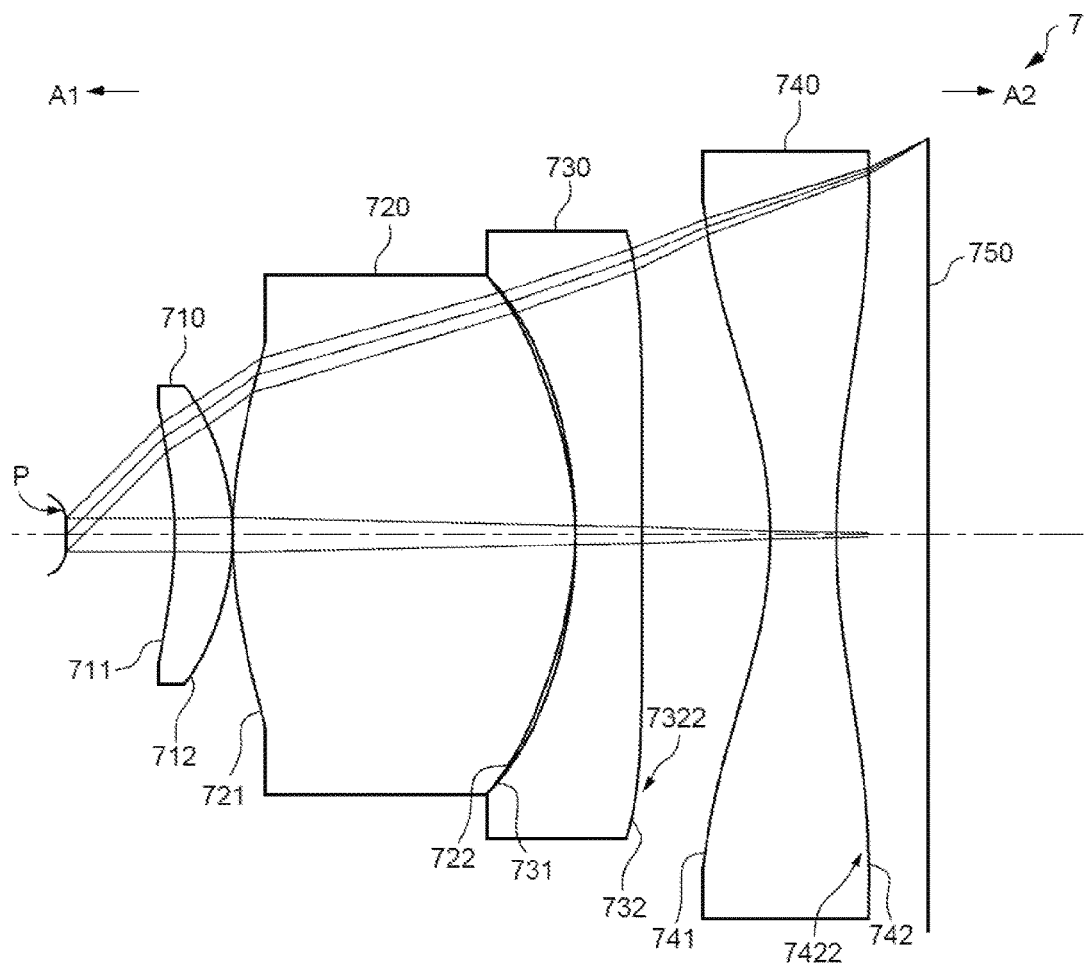
FIG. 31 depicts a cross-sectional view of a seventh embodiment of an ocular optical system having four lens elements according to the present disclosure.
Figure 32:
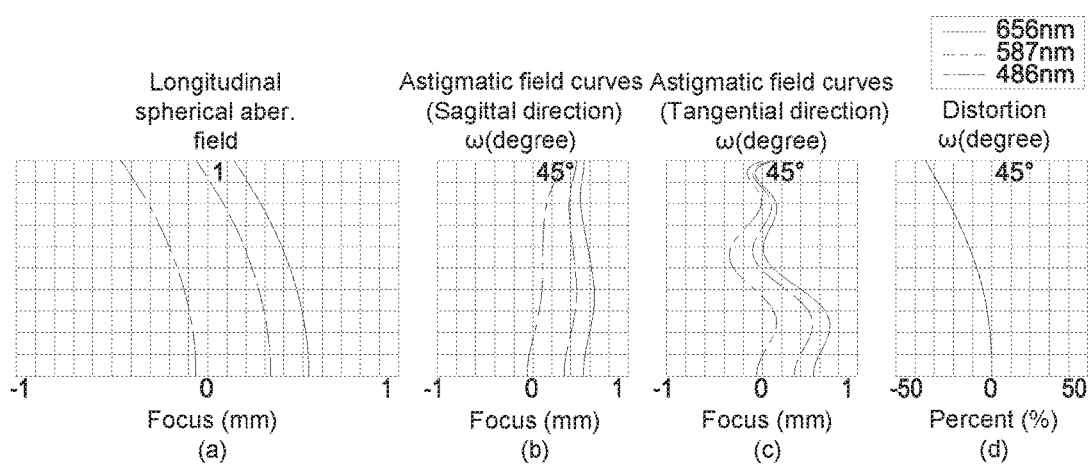
FIG. 32 depicts a chart of longitudinal spherical aberration and other kinds of optical aberrations of a seventh embodiment of the ocular optical system according to the present disclosure.

Reference is now made to FIGS. 31-34. FIG. 31 illustrates an example cross-sectional view of an ocular optical system 7 having four lens elements according to a seventh example embodiment. FIG. 32 shows example charts of longitudinal spherical aberration and other kinds of optical aberrations of the ocular optical system 7 according to the seventh embodiment. FIG. 33 shows an example table of optical data of each lens element of the ocular optical system 7 according to the seventh example embodiment. FIG. 34 shows an example table of aspherical data of the ocular optical system 7 according to the seventh example embodiment. The reference numbers labeled in the present embodiment are similar to those in the first embodiment for the similar elements, but here the reference numbers are initialed with 7, for example, reference number 731 for labeling the eye-side surface of the third lens element 730, reference number 732 for labeling the display-side surface of the third lens element 730, etc.

As shown in FIG. 31, the ocular optical system 7 of the present embodiment, in an order from an eye-side A1 to an display-side A2 along an optical axis, may comprise a first lens element 710, a second lens element 720, a third lens element 730, and fourth lens element 740.

The arrangement of the convex or concave surface structures, including the eye-side surfaces 711, 721, 731, and 741 and the display-side surfaces 712 and 722 are generally similar to the ocular optical system 1. The differences between the ocular optical system 1 and the ocular optical system 7 may include the concave or convex shapes of the display-side surfaces 732 and 742. Additional differences may include a radius of curvature, a thickness, aspherical data, and an effective focal length of each lens element. More specifically, the display-side surface 732 of the third lens element 730 may comprise a convex portion 7322 in a vicinity of a periphery of the third lens element 730, and the display-side surface 742 of the fourth lens element 740 may comprise a concave portion 7422 in a vicinity of a periphery of the fourth lens element 740.

Here, for clearly showing the drawings of the present embodiment, only the surface shapes which are different from that in the first embodiment are labelled. Please refer to FIG. 33 for the optical characteristics of each lens elements in the ocular optical system 7 of the present embodiment.

From the vertical deviation of each curve shown in FIG. 32(a), the offset of the off-axis light relative to the image point may be within about ±0.6 mm. Referring to FIG. 32(b), the focus variation with respect to the three different wavelengths (486 nm, 587 nm, 656 nm) in the whole field may fall within about ±0.7 mm. Referring to FIG. 32(c), the focus variation with respect to the three different wavelengths (486 nm, 587 nm, 656 nm) in the whole field may fall within about ±0.7 mm. Referring to FIG. 32(d), the variation of the distortion aberration of the ocular optical system 7 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the seventh embodiment, ω may be about 45.000 degrees, Fno may be about 19.419, and SL may be about 103.787 mm. In comparison with the first embodiment, the optical aberrations and Fno may be smaller.

Figure 35:
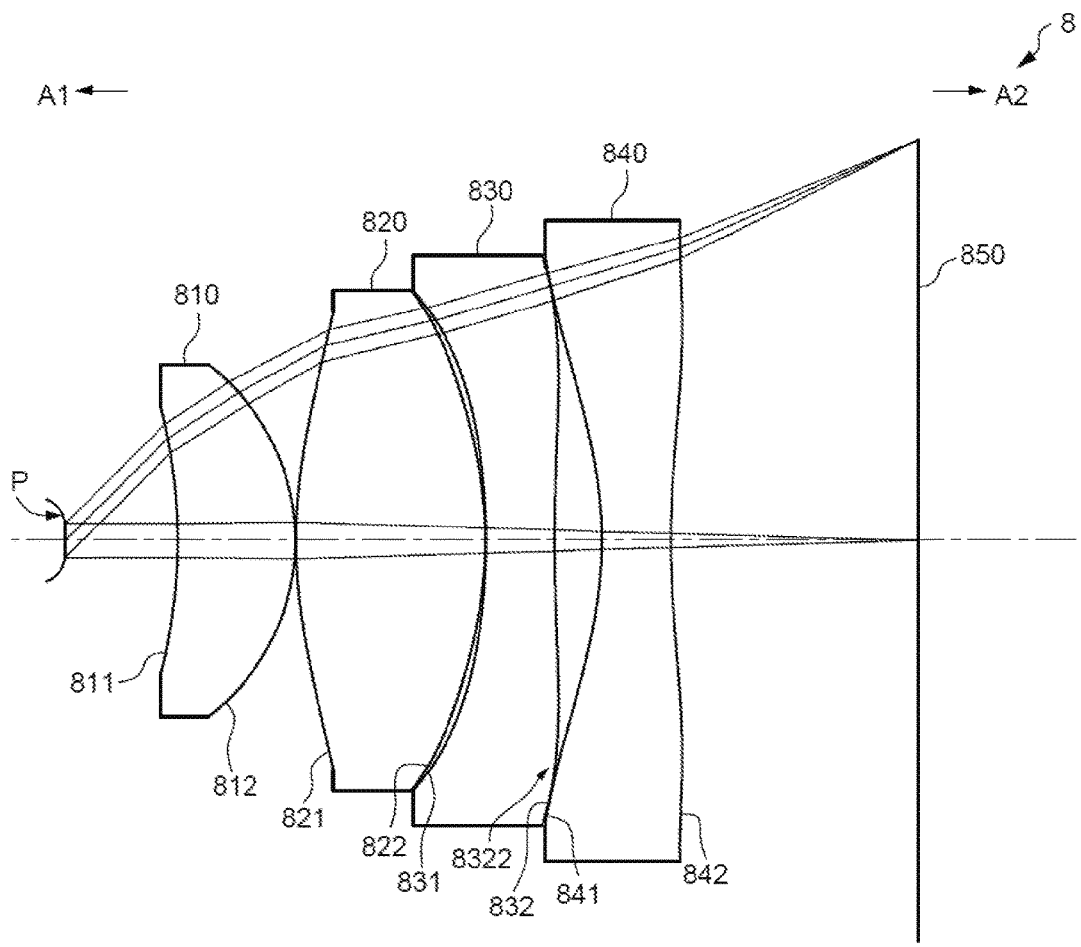
FIG. 35 depicts a cross-sectional view of an eighth embodiment of an ocular optical system having four lens elements according to the present disclosure.
Figure 36:
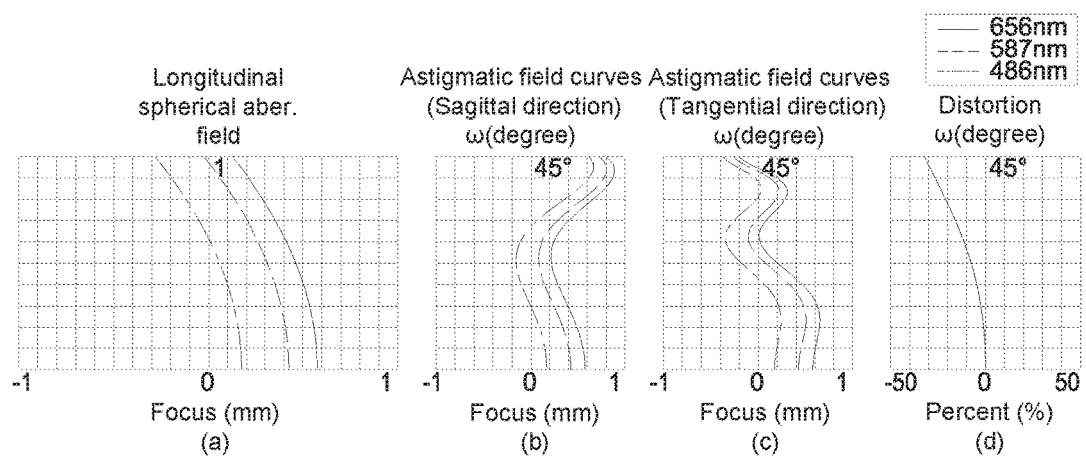
FIG. 36 depicts a chart of longitudinal spherical aberration and other kinds of optical aberrations of an eighth embodiment of the ocular optical system according to the present disclosure.

Reference is now made to FIGS. 35-38. FIG. 35 illustrates an example cross-sectional view of an ocular optical system 8 having four lens elements according to an eighth example embodiment. FIG. 36 shows example charts of longitudinal spherical aberration and other kinds of optical aberrations of the ocular optical system 8 according to the eighth embodiment. FIG. 37 shows an example table of optical data of each lens element of the ocular optical system 8 according to the eighth example embodiment. FIG. 38 shows an example table of aspherical data of the ocular optical system 8 according to the eighth example embodiment. The reference numbers labeled in the present embodiment are similar to those in the first embodiment for the similar elements, but here the reference numbers are initialed with 8, for example, reference number 831 for labeling the eye-side surface of the third lens element 830, reference number 832 for labeling the display-side surface of the third lens element 830, etc.

As shown in FIG. 35, the ocular optical system 8 of the present embodiment, in an order from an eye-side A1 to an display-side A2 along an optical axis, may comprise a first lens element 810, a second lens element 820, a third lens element 830, and a fourth lens element 840.

The arrangement of the convex or concave surface structures, including the eye-side surfaces 811, 821, 831, and 841 and the display-side surfaces 812, 822, and 842 are generally similar to the ocular optical system 1. The differences between the ocular optical system 1 and the ocular optical system 8 may include the concave or convex shapes of the display-side surface 832. Additional differences between the ocular optical system 1 and the ocular optical system 8 may include a radius of curvature, a thickness, aspherical data, and an effective focal length of each lens element. More specifically, the display-side surface 832 of the third lens element 830 may comprise a convex portion 8322 in a vicinity of a periphery of the third lens element 830.

Here, for clearly showing the drawings of the present embodiment, only the surface shapes which are different from that in the first embodiment are labelled. Please refer to FIG. 37 for the optical characteristics of each lens elements in the ocular optical system 8 of the present embodiment.

From the vertical deviation of each curve shown in FIG. 36(a), the offset of the off-axis light relative to the image point may be within about ±0.6 mm. Referring to FIG. 36(b), the focus variation with respect to the three different wavelengths (486 nm, 587 nm, 656 nm) in the whole field may fall within about ±0.9 mm. Referring to FIG. 36(c), the focus variation with respect to the three different wavelengths (486 nm, 587 nm, 656 nm) in the whole field may fall within about ±0.7 mm. Referring to FIG. 36(d), the variation of the distortion aberration of the ocular optical system 8 may be within about ±35%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the eighth embodiment, ω may be about 45.000 degrees, Fno may be about 17.921, and SL may be about 98.837 mm. In comparison with the first embodiment, the optical aberrations, Fno and SL may be smaller.

Figure 39:
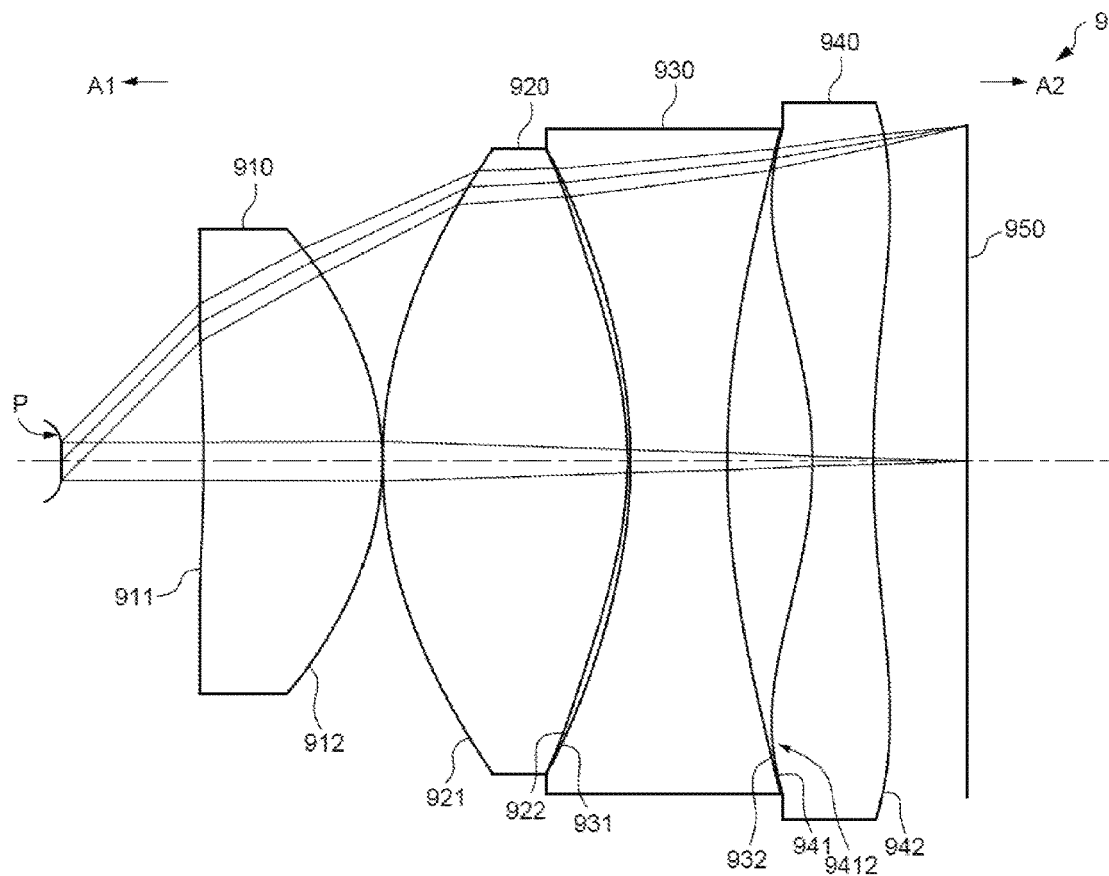
FIG. 39 depicts a cross-sectional view of a ninth embodiment of an ocular optical system having four lens elements according to the present disclosure.
Figure 40:
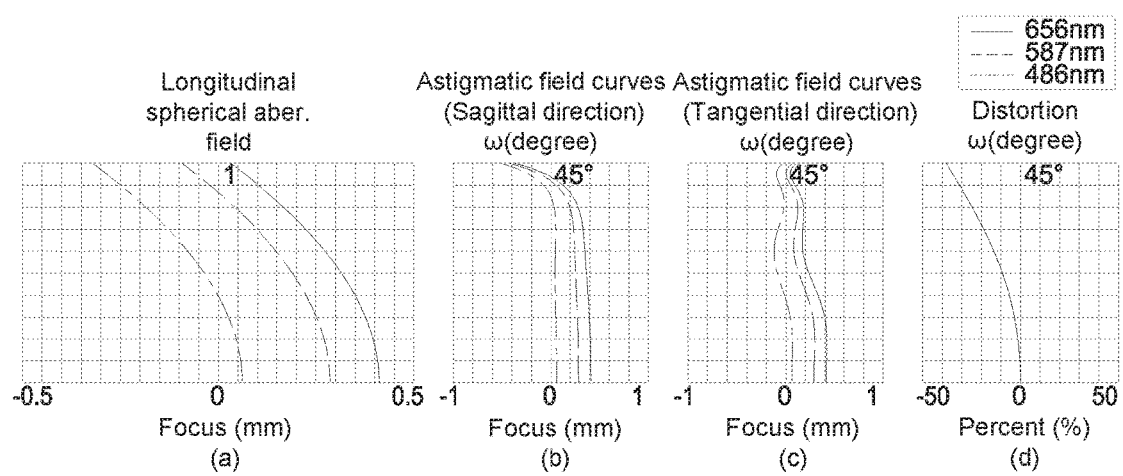
FIG. 40 depicts a chart of longitudinal spherical aberration and other kinds of optical aberrations of a ninth embodiment of the ocular optical system according to the present disclosure.

Reference is now made to FIGS. 39-42. FIG. 39 illustrates an example cross-sectional view of an ocular optical system 9 having four lens elements according to a ninth example embodiment. FIG. 40 shows example charts of longitudinal spherical aberration and other kinds of optical aberrations of the ocular optical system 9 according to the ninth embodiment. FIG. 41 shows an example table of optical data of each lens element of the ocular optical system 9 according to the ninth example embodiment. FIG. 42 shows an example table of aspherical data of the ocular optical system 9 according to the ninth example embodiment. The reference numbers labeled in the present embodiment are similar to those in the first embodiment for the similar elements, but here the reference numbers are initialed with 9, for example, reference number 931 for labeling the eye-side surface of the third lens element 930, reference number 932 for labeling the display-side surface of the third lens element 930, etc.

As shown in FIG. 39, the ocular optical system 9 of the present embodiment, in an order from an eye-side A1 to an display-side A2 along an optical axis, may comprise a first lens element 910, a second lens element 920, a third lens element 930, and a fourth lens element 940.

The arrangement of the convex or concave surface structures, including the eye-side surfaces 911, 921, and 931 and the display-side surfaces 912, 922, 932, and 942 are generally similar to the ocular optical system 1. The differences between the ocular optical system 1 and the ocular optical system 9 may include the convex or concave surface structure of the eye-side surface 941. Additional differences may include a radius of curvature, a thickness, aspherical data, and an effective focal length of each lens element. More specifically, the eye-side surface 941 of the fourth lens element 940 may comprise a convex portion 9412 in a vicinity of a periphery of the fourth lens element 940.

Here, for clearly showing the drawings of the present embodiment, only the surface shapes which are different from that in the first embodiment are labelled. Please refer to FIG. 41 for the optical characteristics of each lens elements in the ocular optical system 9 of the present embodiment.

From the vertical deviation of each curve shown in FIG. 40(a), the offset of the off-axis light relative to the image point may be within about ±0.45 mm. Referring to FIG. 40(b), the focus variation with respect to the three different wavelengths (486 nm, 587 nm, 656 nm) in the whole field may fall within about ±0.6 mm. Referring to FIG. 40(c), the focus variation with respect to the three different wavelengths (486 nm, 587 nm, 656 nm) in the whole field may fall within about ±0.5 mm. Referring to FIG. 40(d), the variation of the distortion aberration of the ocular optical system 9 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the ninth embodiment, ω may be about 45.000 degrees, Fno may be about 14.698, and SL may be about 94.413 mm.

In comparison with the first embodiment, the optical aberrations, Fno and SL may be smaller.

Figure 43:
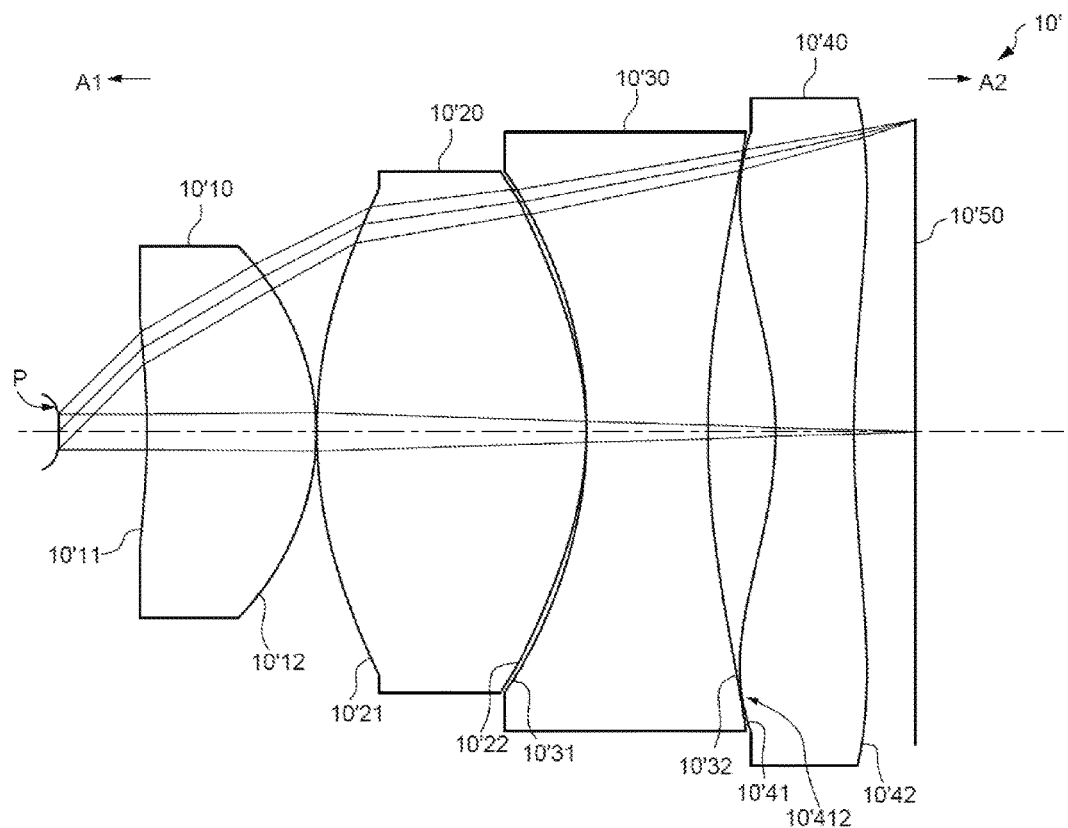
FIG. 43 depicts a cross-sectional view of a tenth embodiment of an ocular optical system having four lens elements according to the present disclosure.
Figure 44:
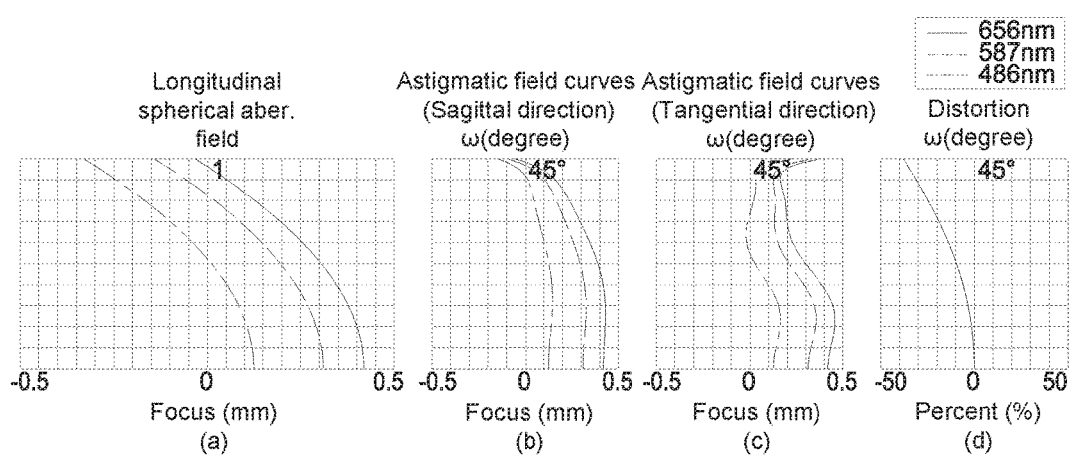
FIG. 44 depicts a chart of longitudinal spherical aberration and other kinds of optical aberrations of a tenth embodiment of the ocular optical system according to the present disclosure.

Reference is now made to FIGS. 43-46. FIG. 43 illustrates an example cross-sectional view of an ocular optical system 10' having four lens elements according to a tenth example embodiment. FIG. 44 shows example charts of longitudinal spherical aberration and other kinds of optical aberrations of the ocular optical system 10' according to the tenth embodiment. FIG. 45 shows an example table of optical data of each lens element of the ocular optical system 10' according to the tenth example embodiment. FIG. 46 shows an example table of aspherical data of the ocular optical system 10' according to the tenth example embodiment. The reference numbers labeled in the present embodiment are similar to those in the first embodiment for the similar elements, but here the reference numbers are initialed with 10', for example, reference number 10'31 for labeling the eye-side surface of the third lens element 10'30, reference number 10'32 for labeling the display-side surface of the third lens element 10'30, etc.

As shown in FIG. 43, the ocular optical system 10' of the present embodiment, in an order from an eye-side A1 to an display-side A2 along an optical axis, may comprise a first lens element 10'10, a second lens element 10'20, a third lens element 10'30, and a fourth lens element 1040.

The arrangement of the convex or concave surface structures, including the eye-side surfaces 10'11, 10'21, and 10'31 and the display-side surfaces 10'12, 10'22, 10'32, and 10'42 are generally similar to the ocular optical system 1. The differences between the ocular optical system 1 and the ocular optical system 10' may include the convex or concave surface structure of the eye-side surface 10'41. Additional differences may include a radius of curvature, a thickness, aspherical data, and an effective focal length of each lens element. More specifically, the eye-side surface 10'41 of the fourth lens element 10'40 may comprise a convex portion 10'412 in a vicinity of a periphery of the fourth lens element 10'40.

Here, for clearly showing the drawings of the present embodiment, only the surface shapes which are different from that in the first embodiment are labelled. Please refer to FIG. 45 for the optical characteristics of each lens elements in the ocular optical system 10' of the present embodiment.

From the vertical deviation of each curve shown in FIG. 44(a), the offset of the off-axis light relative to the image point may be within about ±0.45 mm. Referring to FIG. 44(b), the focus variation with respect to the three different wavelengths (486 nm, 587 nm, 656 nm) in the whole field may fall within about ±0.5 mm. Referring to FIG. 44(c), the focus variation with respect to the three different wavelengths (486 nm, 587 nm, 656 nm) in the whole field may fall within about ±0.5 mm. Referring to FIG. 44(d), the variation of the distortion aberration of the ocular optical system 10 may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the tenth embodiment, ω may be about 45.000 degrees, Fno may be about 14.729, and SL may be about 95.983 mm. In comparison with the first embodiment, the optical aberrations, Fno and SL may be smaller.

Figure 47:
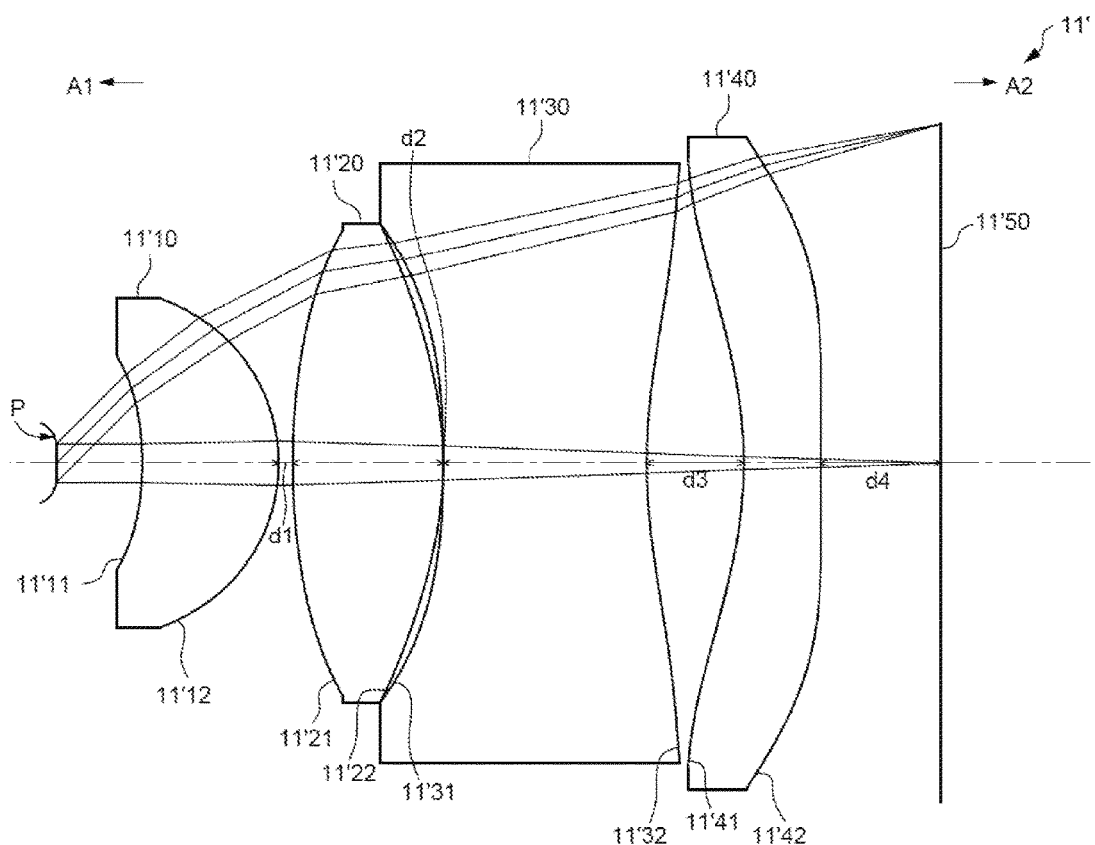
FIG. 47 depicts a cross-sectional view of an eleventh embodiment of an ocular optical system having four lens elements according to the present disclosure.
Figure 48:
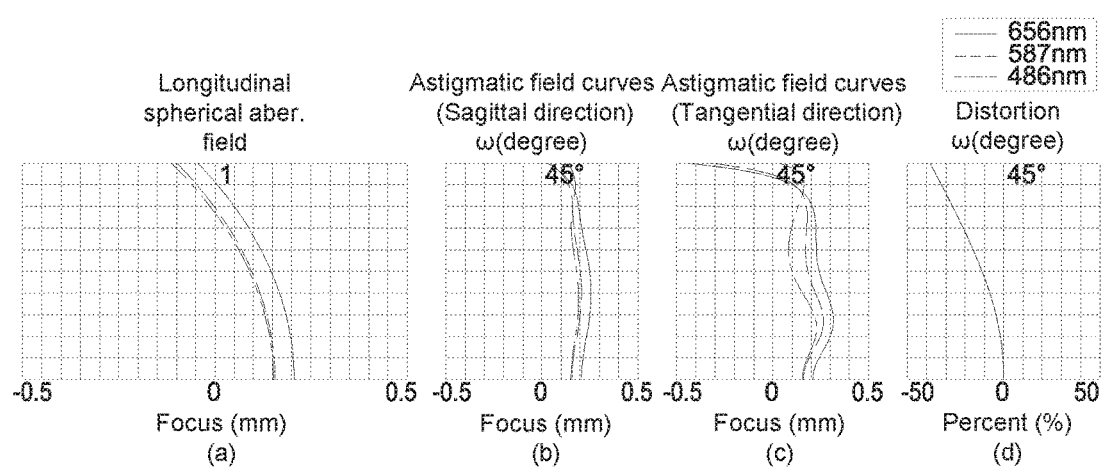
FIG. 48 depicts a chart of longitudinal spherical aberration and other kinds of optical aberrations of a eleventh embodiment of the ocular optical system according to the present disclosure.

Reference is now made to FIGS. 47-50. FIG. 47 illustrates an example cross-sectional view of an ocular optical system 11' having four lens elements according to a eleventh example embodiment. FIG. 48 shows example charts of longitudinal spherical aberration and other kinds of optical aberrations of the ocular optical system 11' according to the eleventh embodiment. FIG. 49 shows an example table of optical data of each lens element of the ocular optical system 11' according to the eleventh example embodiment. FIG. 50 shows an example table of aspherical data of the ocular optical system 11' according to the eleventh example embodiment. The reference numbers labeled in the present embodiment are similar to those in the first embodiment for the similar elements, but here the reference numbers are initialed with 11', for example, reference number 11'131 for labeling the eye-side surface of the third lens element 11'130, reference number 11'132 for labeling the display-side surface of the third lens element 11'130, etc.

As shown in FIG. 47, the ocular optical system 11' of the present embodiment, in an order from an eye-side A1 to an display-side A2 along an optical axis, may comprise a first lens element 11'10, a second lens element 11'20, a third lens element 11'30, and a fourth lens element 11'40.

The arrangement of the convex or concave surface structures, including the eye-side surfaces 11'11, 11'21, 11'31 and 11'41 and the display-side surfaces 11'12, 11'22, 11'32, and 11'42 are generally similar to the ocular optical system 1. The differences may include a radius of curvature, a thickness, aspherical data, and an effective focal length of each lens element.

Here, for clearly showing the drawings of the present embodiment, only the surface shapes which are different from that in the first embodiment are labelled. Please refer to FIG. 49 for the optical characteristics of each lens elements in the ocular optical system 10 of the present embodiment.

From the vertical deviation of each curve shown in FIG. 48(a), the offset of the off-axis light relative to the image point may be within about ±0.25 mm. Referring to FIG. 48(b), the focus variation with respect to the three different wavelengths (486 nm, 587 nm, 656 nm) in the whole field may fall within about ±0.3 mm. Referring to FIG. 48(c), the focus variation with respect to the three different wavelengths (486 nm, 587 nm, 656 nm) in the whole field may fall within about ±0.5 mm. Referring to FIG. 48(d), the variation of the distortion aberration of the ocular optical system 11' may be within about ±40%.

Please refer to FIG. 51 and FIG. 51A for the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the present embodiment.

In the eleventh embodiment, ω may be about 45.000 degrees, Fno may be about 14.700, and SL may be about 91.151 mm. In comparison with the first embodiment, the optical aberrations, Fno and SL may be smaller.

Please refer to FIG. 51 and FIG. 51A show the values of T1, G12, T2, G23, T3, G34, T4, G4D, EFL, TTL, TL, AAG, ALT, EPD, ER, DLD, TL/ER, T1/(G23+G34), (T1+T3)/T4, ALT/AAG, EFL/G4D, TTL/ER, (T1+G12+T2)/(T3+G34+T4), (T3+T4)/G34, T2/T1, T2/(G23+G34), T1/G34, and EFL/AAG of the eleven embodiments, and it is clear that the ocular optical systems of the first to eleventh embodiments may selectively satisfy the Inequalities.

According to above disclosure, the concave portion of the display-side surface of the third lens element in a vicinity of the optical axis and the concave portion of the eye-side surface of the fourth lens element in a vicinity of the optical axis are capable of improving ω and optical aberrations. Moreover, the imaging quality will be better when the display-side surface of the first lens element in a vicinity of the optical axis may have a convex portion, the second lens element may have positive refracting power, or the display-side surface of the second lens element in a vicinity of the optical axis may have a convex portion.

For reducing system length of the ocular optical system while maintaining its imaging quality, the thickness of each lens element and air gap between two adjacent lens elements may be regulated suitably. However, the optical imaging lens may further satisfy the following Inequalities while the yield rate of the ocular optical system may be considered:

0≤TL/ER≤8;

T1/(G23+G34)≤2.5, preferably the range of T1/(G23+G34) is between 0.4 and 2.5;

(T1+T3)/T4≤4.5, preferably the range of (T1+T3)/T4 is between 1.5 and 4.5;

ALT/AAG≤10, preferably the range of ALT/AAG is between 2.0 and 10;

2.4≤EFL/G4D, preferably the range of EFL/G4D is between 2.4 and 9.0;

0≤TTL/ER≤10;

(T1+G12+T2)/(T3+G34+T4)≤2.5, preferably the range of (T1+G12+T2)/(T3+G34+T4) is between 0.5 and 2.5;

(T3+T4)/G34 preferably the range of (T3+T4)/G34 is between 0.8 and 3.0;

0.9≤T2/T1, preferably the range of T2/T1 is between 0.9 and 6.0;

T2/(G23+G34)≤4.0, preferably the range of T2/(G23+G34) is between 0.5 and 4.0;

T1/G34≤3.0, preferably the range of T1/G34 is between 0.4 and 3.0;

4.9≤EFL/AAG, preferably the range of EFL/AAG is between 4.9 and 13.0.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An ocular optical system, adapted for imaging of imaging rays entering an eye of an observer via the ocular optical system from a display screen, a side facing towards the eye being an eye-side, a side facing towards the display screen being a display-side, the ocular optical system comprising a first lens element, a second lens element, a third lens element and a fourth element from the eye-side to the display-side in order along an optical axis, each of the first, second, third, and fourth lens elements having an eye-side surface facing toward the eye-side and a display-side surface facing toward the display-side, wherein:

the display-side surface of the second lens element has a convex portion in a vicinity of the optical axis;

the display-side surface of the third lens element has a concave portion in a vicinity of the optical axis;

the eye-side surface of the fourth lens element has a concave portion in a vicinity of the optical axis;

an effective focal length of the ocular optical system is represented by EFL, an air gap between the fourth lens element and a display screen along the optical axis is represented by G4D, and EFL and G4D satisfy the inequality: EFL/G4D≥2.4; and the ocular optical system comprises no other lenses having refracting power beyond the first, second, third and fourth lens elements.

2. The ocular optical system according to claim 1, wherein a distance between the eye-side surface of the first lens element and the display-side surface of the fourth lens element along the optical axis is represented by TL, a distance between a pupil of an observer and the eye-side surface of the first lens element along the optical axis is represented by ER, TL and ER satisfy the inequality: 0≤TL/ER≤8.

3. The ocular optical system according to claim 1, wherein a central thickness of the first lens element along the optical axis is represented by T1, an air gap between the second lens element and the third lens element along the optical axis is represented by G23, an air gap between the third lens element and the fourth lens element along the optical axis is represented by G34, and T1, G23 and G34 satisfy the inequality: T1/(G23+G34)≤2.5.

4. The ocular optical system according to claim 1, wherein a central thickness of the first lens element along the optical axis is represented by T1, a central thickness of the third lens element along the optical axis is represented by T3, a central thickness of the fourth lens element along the optical axis is represented by T4, and T1, T3 and T4 satisfy the inequality: (T1+T3)/T4≤4.5.

5. The ocular optical system according to claim 1, wherein a sum of the central thicknesses of the first to the fourth lens elements is represented by ALT, a sum of all air gaps from the first lens element to the fourth lens element along the optical axis is represented by AAG, and ALT and AAG satisfy the inequality: ALT/AAG≤10.

6. An ocular optical system, adapted for imaging of imaging rays entering an eye of an observer via the ocular optical system from a display screen, a side facing towards the eye being an eye-side, a side facing towards the display screen being a display-side, the ocular optical system comprising a first lens element, a second lens element, a third lens element and a fourth element from the eye-side to the display-side in order along an optical axis, each of the first, second, third, and fourth lens elements having an eye-side surface facing toward the eye-side and a display-side surface facing toward the display-side, wherein:

the second lens element has positive refracting power;

the display-side surface of the third lens element has a concave portion in a vicinity of the optical axis;

the eye-side surface of the fourth lens element has a concave portion in a vicinity of the optical axis;

an effective focal length of the ocular optical system is represented by EFL, an air gap between the fourth lens element and a display screen along the optical axis is represented by G4D, and EFL and G4D satisfy the inequality: EFL/G4D≥2.4; and the ocular optical system comprises no other lenses having refracting power beyond the first, second, third and fourth lens elements.

7. The ocular optical system according to claim 6, wherein a distance between the eye-side surface of the first lens element and a display screen along the optical axis is represented by TTL, a distance between a pupil of an observer and the eye-side surface of the first lens element along the optical axis is represented by ER, and TTL and ER satisfy the inequality: 0≤TTL/ER≤10.

8. The ocular optical system according to claim 6, wherein a sum of the central thicknesses of the first to the fourth lens elements is represented by ALT, a sum of all air gaps from the first to the fourth lens elements along the optical axis is represented by AAG, and ALT and AAG satisfy the inequality: ALT/AAG≤10.

9. The ocular optical system according to claim 6, wherein a central thickness of the first lens element along the optical axis is represented by T1, an air gap between the first lens element and the second lens element along the optical axis is represented by G12, a central thickness of the second lens element along the optical axis is represented by T2, a central thickness of the third lens element along the optical axis is represented by T3, an air gap between the third lens element and the fourth lens element along the optical axis is represented by G34, a central thickness of the fourth lens element along the optical axis is represented by T4, and T1, G12, T2, T3, G34, and T4 satisfy the inequality: (T1+G12+T2)/(T3+G34+T4)≤2.5.

10. The ocular optical system according to claim 6, wherein a central thickness of the third lens element along the optical axis is represented by T3, a central thickness of the fourth lens element along the optical axis is represented by T4, an air gap between the third lens element and the fourth lens element along the optical axis is represented by G34, and T3, T4 and G34 satisfy the inequality: (T3+T4)/G34≤3.0.

11. An ocular optical system, adapted for imaging of imaging rays entering an eye of an observer via the ocular optical system from a display screen, a side facing towards the eye being an eye-side, a side facing towards the display screen being a display-side, the ocular optical system comprising a first lens element, a second lens element, a third lens element and a fourth element from the eye-side to the display-side in order along an optical axis, each of the first, second, third, and fourth lens elements having an eye-side surface facing toward the eye-side and a display-side surface facing toward the display-side, wherein:

the display-side surface of the first lens element has a convex portion in a vicinity of the optical axis;

the display-side surface of the third lens element has concave portion in a vicinity of the optical axis;

the eye-side surface of the fourth lens element has a concave portion in a vicinity of the optical axis;

an effective focal length of the ocular optical system is represented by EFL, an air gap between the fourth lens element and a display screen along the optical axis is represented by G4D, and EFL and G4D satisfy the inequality: EFL/G4D≥2.4; and the ocular optical system comprises no other lenses having refracting power beyond the first, second, third and fourth lens elements.

12. The ocular optical system according to claim 11, wherein a central thickness of the first lens element along the optical axis is represented by T1, a central thickness of the second lens element along the optical axis is represented by T2, and T1 and T2 satisfy the inequality: T2/T1≥0.9.

13. The ocular optical system according to claim 11, wherein a distance between the eye-side surface of the first lens element and the display-side surface of the fourth lens element along the optical axis is represented by TL, a distance between a pupil of an observer and the eye-side surface of the first lens element along the optical axis is represented by ER, TL and ER satisfy the inequality: 0≤TL/ER≤8.

14. The ocular optical system according to claim 11, wherein a central thickness of the second lens element along the optical axis is represented by T2, an air gap between the second lens element and the third lens element along the optical axis is represented by G23, an air gap between the third lens element and the fourth lens element along the optical axis is represented by G34, and T2, G23 and G34 satisfy the inequality: T2/(G23+G34)≤4.0.

15. The ocular optical system according to claim 11, wherein a central thickness of the first lens element along the optical axis is represented by T1, an air gap between the third lens element and the fourth lens element along the optical axis is represented by G34, and T1 and G34 satisfy the inequality: T1/G34≤3.0.

16. The ocular optical system according to claim 11, wherein a sum of all air gaps from the first to the fourth lens elements along the optical axis is represented by AAG, and EFL and AAG satisfy the inequality: EFL/AAG≥4.9.

* * * * *